United States Patent
Chiang et al.

(10) Patent No.: US 8,570,480 B2
(45) Date of Patent: Oct. 29, 2013

(54) DISPLAY DEVICE HAVING SLIM BORDER-AREA ARCHITECTURE AND DRIVING METHOD THEREOF

(75) Inventors: Yi-Chen Chiang, Hsin-Chu (TW);
Chih-Hung Shih, Hsin-Chu (TW);
Maw-Song Chen, Hsin-Chu (TW);
Tzu-Wei Ho, Hsin-Chu (TW);
Ching-Huan Lin, Hsin-Chu (TW);
Yu-Hsuan Li, Hsin-Chu (TW); Yao-Jen Hsieh, Hsin-Chu (TW); Ya-Ting Hsu, Hsin-Chu (TW); Chi-Mao Hung, Hsin-Chu (TW); Ken-Ming Chen, Hsin-Chu (TW); Yu-Cheng Chen, Hsin-Chu (TW)

(73) Assignee: AU Optronics Corp., Science-Based Industrial Park, Hsin-Chu (TW)

( * ) Notice: Subject to any disclaimer, the term of this patent is extended or adjusted under 35 U.S.C. 154(b) by 1135 days.

(21) Appl. No.: 12/410,475

(22) Filed: Mar. 25, 2009

(65) Prior Publication Data
US 2010/0171687 A1  Jul. 8, 2010

(30) Foreign Application Priority Data
Jan. 8, 2009 (TW) .............................. 98100467 A

(51) Int. Cl.
*G02F 1/1345* (2006.01)
*G09G 3/36* (2006.01)
*G06F 3/038* (2013.01)

(52) U.S. Cl.
USPC ............. 349/152; 349/149; 349/151; 345/50; 345/98; 345/205

(58) Field of Classification Search
USPC .................. 349/149–152; 345/98, 205, 50
See application file for complete search history.

(56) References Cited

U.S. PATENT DOCUMENTS

| 7,002,657 | B2 | 2/2006 | Hirosue | |
|---|---|---|---|---|
| 7,199,779 | B2 | 4/2007 | Toriumi | |
| 7,271,871 | B2 | 9/2007 | Jen | |
| 7,375,716 | B2 | 5/2008 | Toriumi | |
| 2003/0160921 | A1* | 8/2003 | Nakashima et al. | 349/113 |
| 2007/0085960 | A1* | 4/2007 | Kim | 349/149 |
| 2008/0002126 | A1* | 1/2008 | Lim et al. | 349/141 |

FOREIGN PATENT DOCUMENTS

| CN | 1584712 A | | 2/2005 |
|---|---|---|---|
| JP | 11-305681 | * | 5/1999 |
| JP | 11305681 A | | 11/1999 |
| JP | 2001174842 | | 6/2001 |
| TW | 591591 | | 6/2004 |
| TW | I222541 | | 10/2004 |

* cited by examiner

*Primary Examiner* — Lauren Nguyen
(74) *Attorney, Agent, or Firm* — Winston Hsu; Scott Margo

(57) ABSTRACT

A display device having slim border-area architecture is disclosed. The display device includes a substrate, a plurality of data lines, a plurality of gate lines, a plurality of auxiliary gate lines and a driving module. The substrate includes a display area and a border area. The data lines, the gate lines and the auxiliary gate lines are disposed in the display area. The driving module is disposed in the border area. The gate lines are crossed with the data lines perpendicularly. The auxiliary gate lines are parallel with the data lines. Each auxiliary gate line is electrically connected to one corresponding gate line. The data and auxiliary gate lines are electrically connected to the driving module based on an interlace arrangement. Further disclosed is a driving method for delivering gate signals provided by the driving module to the gate lines via the auxiliary gate lines.

28 Claims, 28 Drawing Sheets

DISPLAY DEVICE HAVING SLIM BORDER-AREA ARCHITECTURE AND DRIVING METHOD THEREOF

BACKGROUND OF THE INVENTION

1. Field of the Invention

The present invention relates to a display device and driving method thereof, and more particularly, to a display device having slim border-area architecture and driving method thereof.

2. Description of the Prior Art

Among existing display devices, the flat-panel displays have gained utmost popularity. Furthermore, among the flat-panel displays, the liquid crystal displays (LCDs) are widely applied in various electronic products such as computer monitors, mobile phones, personal digital assistants (PDAs), or flat-panel televisions due to advantages of thin appearance, low power consumption, and low radiation. In general, the liquid crystal display comprises a liquid crystal layer encapsulated between two substrates and a backlight module for providing a backlight source. The operation of a liquid crystal display is featured by varying voltage drops between opposite sides of the liquid crystal layer for twisting the angles of the liquid crystal molecules of the liquid crystal layer so that the transmittance of the liquid crystal layer can be controlled for illustrating images with the aid of the backlight source.

FIG. 1 is a schematic diagram showing a conventional liquid crystal display. As shown in FIG. 1, the liquid crystal display 100 comprises a bottom substrate 110, a top substrate 190 positioned above top of the bottom substrate 110, and a liquid crystal layer (not shown) encapsulated between the bottom substrate 110 and the top substrate 190. The top substrate 190 is a color filter employed to display color images. The bottom substrate 110 comprises a plurality of data lines 130, a plurality of gate lines 150, a plurality of auxiliary gate lines 155, a first border area 180, a second border area 185, a display area 195 and a driving module 101. The data lines 130 and the gate lines 150 are disposed in the display area 195. The auxiliary gate lines 155 are disposed in the first border area 180 and the second border area 185. The driving module 101 is electrically connected to the auxiliary gate lines 155 so that a plurality of gate signals provided can be furnished to the gate lines 150 via the auxiliary gate lines 155. The driving module 101 is further electrically connected to the data lines 130 so that a plurality of data signals provided can be furnished to a plurality of pixel units (not shown) via the data lines 130. The liquid crystal display 100 makes use of the gate signals for providing a control of writing the data signals into the pixel units so as to illustrate images.

In the structure of the conventional liquid crystal display 100, the number of the auxiliary gate lines 155 is substantially equal to the number of the gate lines 150. For that reason, the bottom substrate 110 is required to provide the first border area 180 and the second border area 185 both having sufficient widths and space for accommodating the auxiliary gate lines 155. However, because the displays installed in most of the portable electronic devices are small-size liquid crystal displays, how to reduce substrate dimension by shrinking border area for devising a small-size liquid crystal display has become one of the most important topics nowadays.

SUMMARY OF THE INVENTION

In accordance with an embodiment of the present invention, a display device having slim border-area architecture is provided. The display device comprises a substrate, a plurality of data lines, a plurality of gate lines, a plurality of auxiliary gate lines and a driving module. The substrate comprises a display area and a border area. The border area is substantially surrounding the display area. The data lines, paralleled with each other, are disposed in the display area of the substrate. The gate lines, paralleled with each other and disposed in the display area of the substrate, are substantially crossed with the data lines perpendicularly. The auxiliary gate lines, paralleled with each other and disposed in the display area of the substrate, are substantially parallel with the data lines. Each auxiliary gate line is electrically connected to a corresponding gate line of the gate lines. The driving module, disposed in the border area of the substrate, is electrically connected to the data lines and the auxiliary gate lines.

The present invention further provides a driving method comprising: providing a display device, the display device comprising: a substrate comprising a display area, a first border area, a second border area and a third border area; a plurality of data lines disposed in the display area of the substrate; a first set of gate lines, a second set of gate lines and a third set of gate lines disposed in the display area of the substrate; a plurality of first auxiliary gate lines disposed in the display area of the substrate, each first auxiliary gate line being electrically connected to a corresponding gate line of the first set of gate lines; a plurality of second auxiliary gate lines disposed in the first border area of the substrate, each second auxiliary gate line being electrically connected to a corresponding gate line of the second set of gate lines; a plurality of third auxiliary gate lines disposed in the second border area of the substrate, each third auxiliary gate line being electrically connected to a corresponding gate line of the third set of gate lines; and a driving module disposed in the third border area of the substrate, the driving module comprising a plurality data output ports, a plurality of first output ports, a plurality of second output ports and a plurality of third output ports, each data output port being electrically connected to a corresponding data line, each first output port being electrically connected to a corresponding second auxiliary gate line, each second output port being electrically connected to a corresponding first auxiliary gate line, each third output port being electrically connected to a corresponding third auxiliary gate line, wherein the data output ports and the second output ports are disposed in the driving module based on an interlace arrangement; sequentially outputting a plurality of first gate signals from the first output ports to the second auxiliary gate lines based on a sequence along a first direction; sequentially outputting a plurality of second gate signals from the second output ports to the first auxiliary gate lines based on a sequence along a second direction; and sequentially outputting a plurality of third gate signals from the third output ports to the third auxiliary gate lines based on a sequence along the second direction.

Still, the present invention provides a driving method comprising: providing a display device, the display device comprising: a substrate comprising a display area, a first border area and a second border area; a plurality of data lines disposed in the display area of the substrate; a first set of gate lines and a second set of gate lines disposed in the display area of the substrate; a plurality of first auxiliary gate lines disposed in the display area of the substrate, each first auxiliary gate line being electrically connected to a corresponding gate line of the first set of gate lines; a plurality of second auxiliary gate lines disposed in the first border area of the substrate, each second auxiliary gate line being electrically connected to a corresponding gate line of the second set of gate lines; and a driving module disposed in the second border area of the substrate, the driving module comprising a plurality data output ports, a plurality of first output ports and a plurality of second output ports, each data output port being electrically connected to a corresponding data line, each first output port being electrically connected to a corresponding second auxiliary gate line, each second output port being electrically connected to a corresponding first auxiliary gate line, wherein the data output ports and the second output ports are disposed in the driving module based on an interlace arrangement; sequentially outputting a plurality of first gate signals from the first output ports to the second auxiliary gate lines based on a sequence along a first direction; and sequentially outputting a plurality of second gate signals from the second output ports to the first auxiliary gate lines based on a sequence along a second direction.

These and other objectives of the present invention will no doubt become obvious to those of ordinary skill in the art after reading the following detailed description of the preferred embodiment that is illustrated in the various figures and drawings.

DETAILED DESCRIPTION

Hereinafter, preferred embodiments of the present invention will be described in detail with reference to the accompanying drawings. Here, it is to be noted that the present invention is not limited thereto.

Figure 1:
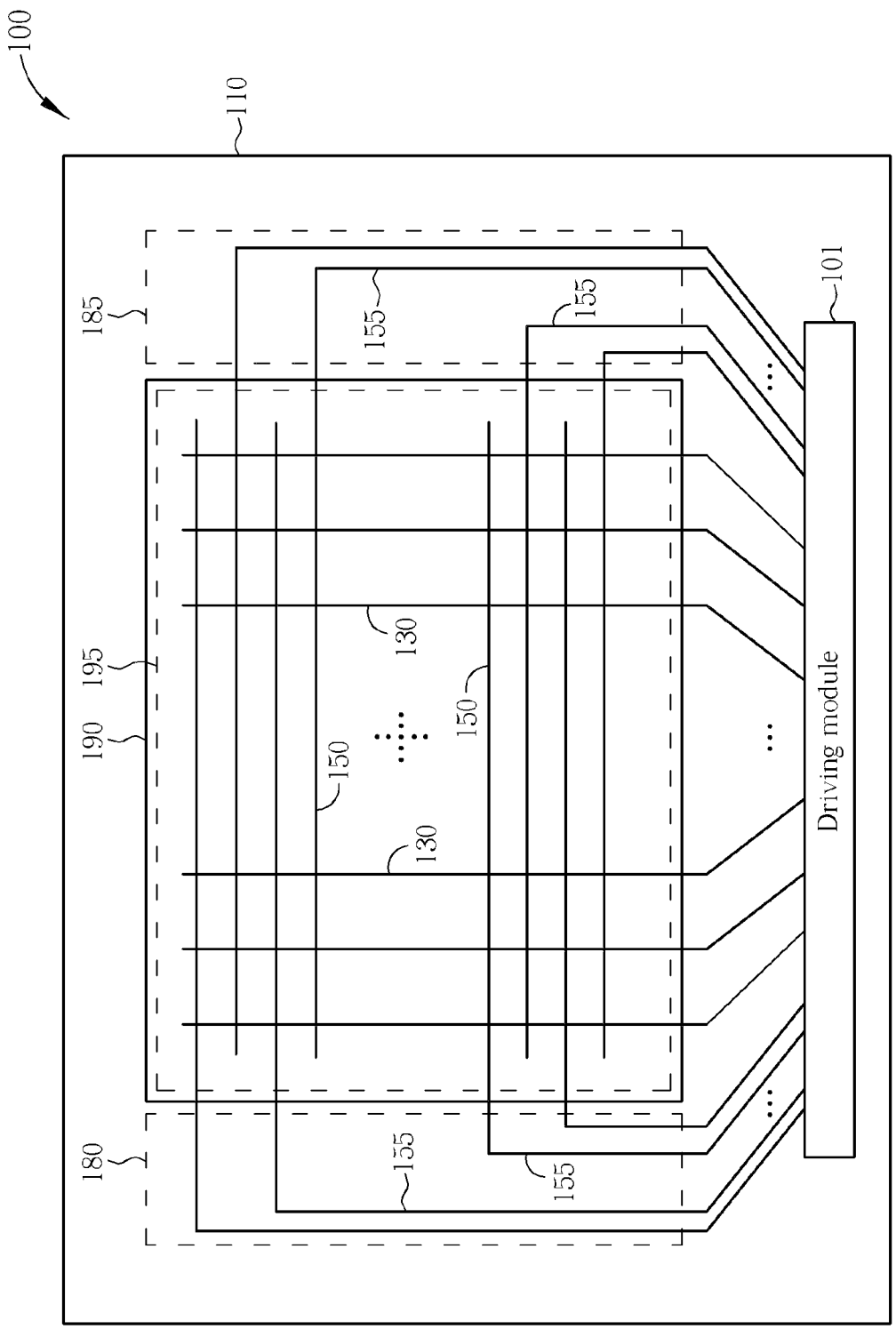
FIG. 1 is a schematic diagram showing a prior-art liquid crystal display.
Figure 2:
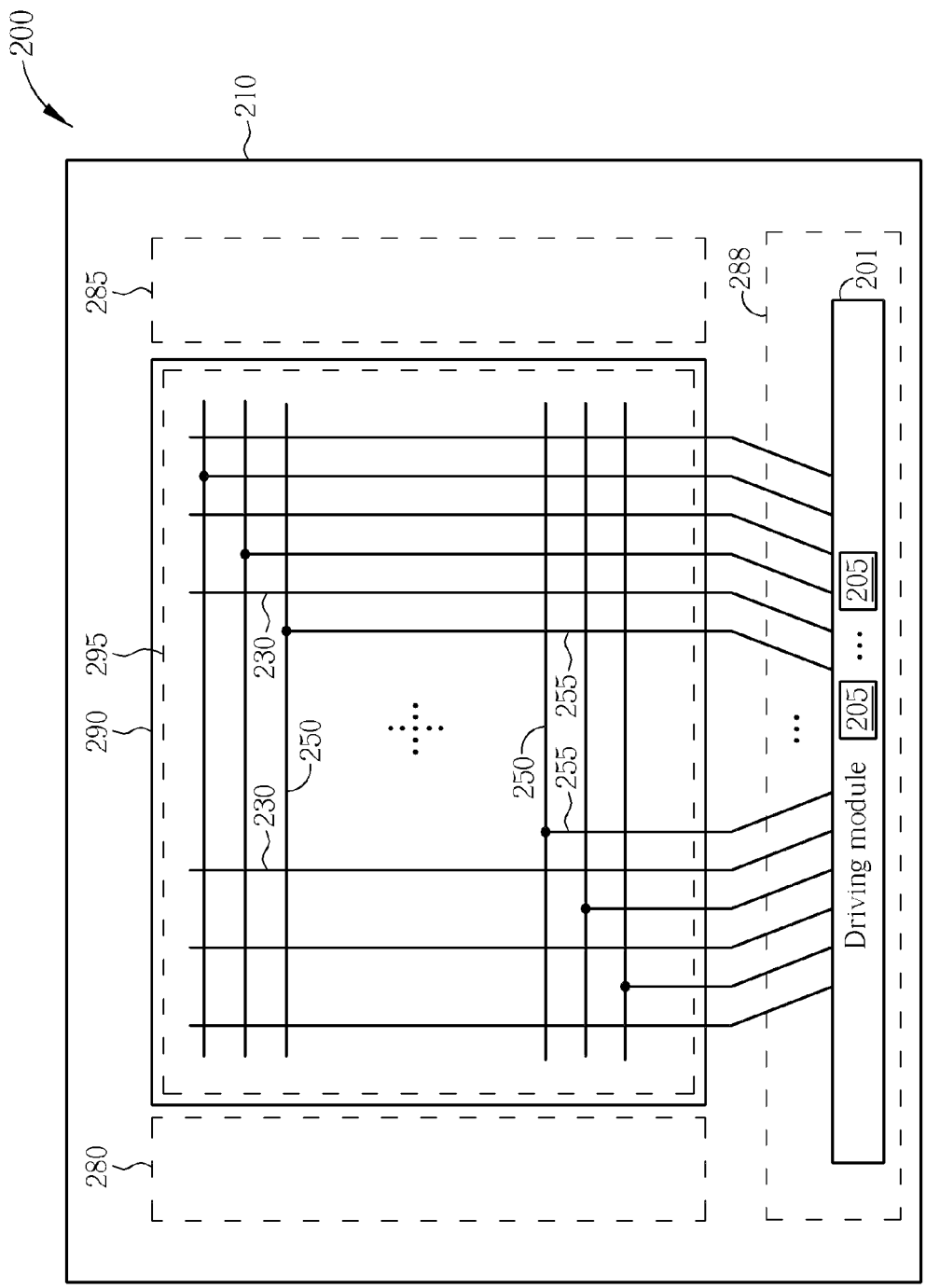
FIG. 2 is a schematic diagram showing a liquid crystal display in accordance with a first embodiment of the present invention.

FIG. 2 is a schematic diagram showing a liquid crystal display in accordance with a first embodiment of the present invention. As shown in FIG. 2, the liquid crystal display 200 comprises a bottom substrate 210, a top substrate 290 positioned above top of the bottom substrate 210, and a liquid crystal layer (not shown) encapsulated between the bottom substrate 210 and the top substrate 290. The top substrate 290 may be a color filter employed to display color images, for example. The bottom substrate 210 comprises a plurality of parallel data lines 230, a plurality of parallel gate lines 250, a plurality of parallel auxiliary gate lines 255, a first border area 280, a second border area 285, a third border area 288, a display area 295 and a driving module 201. The first border area 280, the second border area 285 and the third border area 288 are substantially surrounding the display area 295. That is, the aforementioned border areas at least surround part of the display area 295. For instance, the first border area 280, the second border area 285 and the third border area 288 are substantially adjacent to three edges of the display area 295 and around the display area 295. The data lines 230, the gate lines 250 and the auxiliary gate lines 255 are disposed in the display area 295. The driving module 201 is disposed in the third border area 288. The gate lines 250 are substantially crossed with the data lines 230 perpendicularly. The auxiliary gate lines 255 are substantially parallel with the data lines 230. Each auxiliary gate line 255 is electrically connected to one corresponding gate line 250. In the embodiment shown in FIG. 2, each auxiliary gate line 255 is wiring from the driving module 201 to one corresponding gate line 250. In another embodiment, each auxiliary gate line 255 is further extending from the corresponding gate line 250 to the edge of the display area 295. The driving module 201 is electrically connected to the auxiliary gate lines 255 so that a plurality of gate signals provided can be furnished to the gate lines 250 via the auxiliary gate lines 255. The driving module 201 is further electrically connected to the data lines 230 so that a plurality of data signals provided can be furnished to a plurality of pixel units (not shown) via the data lines 230. The liquid crystal display 200 makes use of the gate signals for providing a control of writing the data signals into the pixel units so as to illustrate images.

In one embodiment, the driving module 201 comprises at least one driver 205 for providing the data signals and the gate signals respectively to the data lines 230 and the auxiliary gate lines 255. In another embodiment, the driving module 201 comprises a plurality of drivers 205. The drivers 205 comprise at least one source driver and at least one gate driver. The source driver is electrically connected to the data lines 230 for providing the data signals. The gate driver is electrically connected to the auxiliary gate lines 255 for providing the gate signals to the gate lines 250.

Since all the auxiliary gate lines 255 are disposed in the display area 295, the first border area 280 and the second border area 285 are not required to accommodate any auxiliary gate line 255, and therefore the widths and space of the first border area 280 and the second border area 285 can be decreased significantly for reducing the size of the bottom substrate 210. For that reason, the liquid crystal display 200 is particularly suitable for use as a small-size display installed in any portable electronic device.

Figure 3:
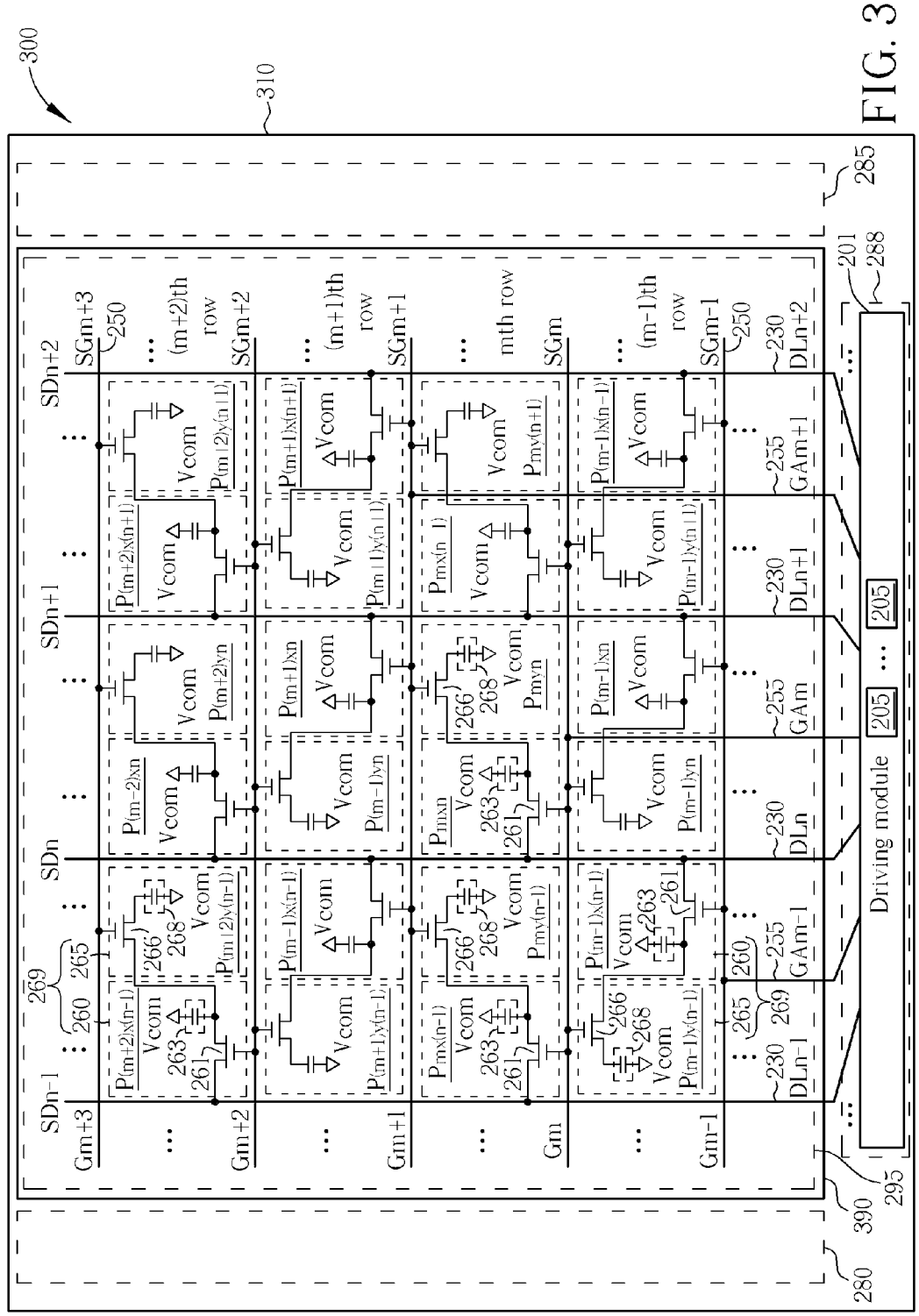
FIG. 3 is a schematic diagram showing a liquid crystal display in accordance with a second embodiment of the present invention.

FIG. 3 is a schematic diagram showing a liquid crystal display in accordance with a second embodiment of the present invention. As shown in FIG. 3, the liquid crystal display 300 comprises a bottom substrate 310, a top substrate 390 positioned above top of the bottom substrate 310, and a liquid crystal layer (not shown) encapsulated between the bottom substrate 310 and the top substrate 390. The top substrate 390 may be a color filter employed to display color images, for example. The circuit structure of the bottom substrate 310 is similar to that of the bottom substrate 210 shown in FIG. 2. The bottom substrate 310 is disposed therein with a plurality of pixel units 269 based on a half source driver (HSD) technology. That is, in the array of the pixel units 269, parts of the pixel units 269 are not directly coupled to the data lines 230, and only the pixel units 269 having either odd or even order in each row are directly coupled to the data lines 230. Accordingly, compared with the conventional liquid crystal display 100, the number of the data lines 230 can be reduced to a half of the number of the data lines 130, and the wiring areas of the omitted data lines 230 are then employed to dispose the auxiliary gate lines 255.

The pixel units 269 comprise a plurality of first pixel units 260 and a plurality of second pixel units 265. Each first pixel unit 260 comprises a first data switch 261 and a first storage unit 263. The first data switch 261 comprises a first end electrically connected to one corresponding data line 230, a second end electrically connected to one corresponding second pixel unit 265, and a gate end electrically connected to one corresponding gate line 250. The first data switch 261 is a thin film transistor or a metal oxide semiconductor (MOS) field effect transistor. The first storage unit 263 comprises a first end electrically connected to the second end of one corresponding first data switch 261 and a second end for receiving a common voltage Vcom. The first storage unit 263 comprises a liquid crystal capacitor.

Each second pixel unit 265 comprises a second data switch 266 and a second storage unit 268. The second data switch 266 comprises a first end electrically connected to the second end of one corresponding first data switch 261, a second end electrically connected to one corresponding second storage unit 268, and a gate end electrically connected to one corresponding gate line 250. The second data switch 266 is a thin film transistor or a MOS field effect transistor. The second storage unit 268 comprises a first end electrically connected to the second end of one corresponding second data switch 266 and a second end for receiving the common voltage Vcom. The second storage unit 268 comprises a liquid crystal capacitor. It is noted that each auxiliary gate line 255 is disposed between one corresponding first pixel unit 260 and one corresponding second pixel unit 265. That is, each wiring area between adjacent first and second pixel units 260, 265 can be disposed with either one data line 230 or one auxiliary gate line 255.

Please continue referring to FIG. 3, each first pixel units 260 is directly coupled to one corresponding data line 230. For that reason, each data signal delivered by one corresponding data line 230 is written into one corresponding first storage unit 263 via just one corresponding first data switch 261. However, each second pixel unit 265 is coupled to one corresponding data line 230 indirectly via one corresponding first pixel unit 260. For that reason, each data signal delivered by one corresponding data line 230 is written into one corresponding second storage unit 268 via both one corresponding first data switch 261 and one corresponding second data switch 266.

Figure 4:
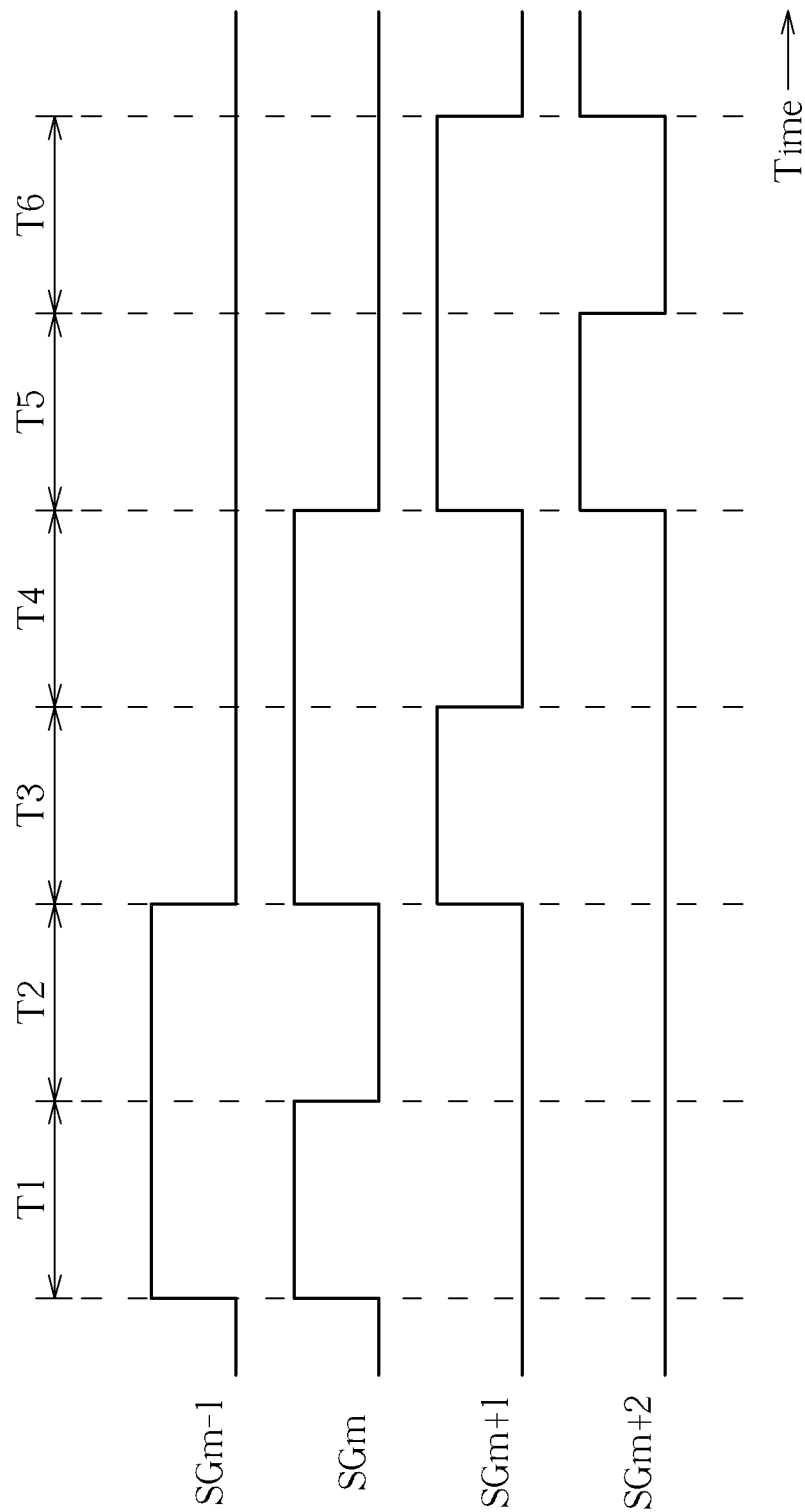
FIG. 4 is a schematic diagram showing gate signal waveforms regarding the operation of the liquid crystal display shown in FIG. 3, having time along the abscissa.

FIG. 4 is a schematic diagram showing gate signal waveforms regarding the operation of the liquid crystal display shown in FIG. 3, having time along the abscissa. The gate signal waveforms in FIG. 4, from top to bottom, are the gate signal SGm−1, the gate signal SGm, the gate signal SGm+1 and the gate signal SGm+2. During an interval T1, both the gate signals SGm−1 and SGm have high voltage level for turning on a plurality of first and second data switches 261, 266 in a (m−1)th row, and therefore a plurality of data signals can be written into a plurality of second storage units 268 in the (m−1)th row via the data lines 230. For instance, the gate signal SGm−1 having high voltage level is furnished to the first pixel unit $P_{(m-1)x(n-1)}$ via the auxiliary gate line GAm−1 and the gate line Gm−1 so as to turn on the first data switch 261 of the first pixel unit $P_{(m-1)x(n-1)}$. The gate signal SGm having high voltage level is furnished to the second pixel unit $P_{(m-1)y(n-1)}$ via the auxiliary gate line GAm and the gate line Gm so as to turn on the second data switch 266 of the second pixel unit $P_{(m-1)y(n-1)}$. Accordingly, the data signal SDn can be written into the second storage unit 268 of the second pixel unit $P_{(m-1)y(n-1)}$ via the data line DLn. In the meantime, although the data signal SDn is also written into the first storage unit 263 of the first pixel unit $P_{(m-1)x(n-1)}$, the written data signal SDn stored in the first pixel unit $P_{(m-1)x(n-1)}$ is overwritten by the data signal written during the following interval.

During an interval T2, the gate signal SGm is switching to low voltage level while the gate signal SGm−1 retains high voltage level, and therefore the second data switches 266 of the (m−1)th row are switching to turn-off state while the first data switches 261 of the (m−1)th row retain turn-on state. Accordingly, a plurality of data signals can be written into the first storage units 263 of the (m−1)th row via the data lines 230; meanwhile, the data signals stored in the second storage units 268 of the (m−1)th row are retained. It is noted that the data signals written into the first storage units 263 of the (m−1)th row during the interval T2 will overwrite the data signals written into the first storage units 263 of the (m−1)th row during the interval T1.

During an interval T3, both the gate signals SGm and SGm+1 have high voltage level for turning on a plurality of first and second data switches 261, 266 in an mth row, and therefore a plurality of data signals can be written into a plurality of second storage units 268 in the mth row via the data lines 230. For instance, the gate signal SGm having high voltage level is furnished to the first pixel unit $P_{mxn}$ via the auxiliary gate line GAm and the gate line Gm so as to turn on the first data switch 261 of the first pixel unit $P_{mxn}$. The gate signal SGm+1 having high voltage level is furnished to the second pixel unit $P_{myn}$ via the auxiliary gate line GAm+1 and the gate line Gm+1 so as to turn on the second data switch 266 of the second pixel unit $P_{myn}$. Accordingly, the data signal SDn can be written into the second storage unit 268 of the second pixel unit $P_{myn}$ via the data line DLn. In the meantime, although the data signal SDn is also written into the first storage unit 263 of the first pixel unit $P_{mxn}$, the written data signal SDn stored in the first pixel unit $P_{mxn}$ is overwritten by the data signal written during the subsequent interval.

During an interval T4, the gate signal SGm+1 is to low voltage level while the gate signal SGm retains high voltage level, and therefore the second data switches 266 of the mth row are switching to turn-off state while the first data switches 261 of the mth row retain turn-on state. Accordingly, a plurality of data signals can be written into the first storage units 263 of the mth row via the data lines 230; meanwhile, the data signals stored in the second storage units 268 of the mth row are retained. It is noted that the data signals written into the first storage units 263 of the mth row during the interval T4 will overwrite the data signals written into the first storage units 263 of the mth row during the interval T3.

During an interval T5, both the gate signals SGm+1 and SGm+2 have high voltage level for turning on a plurality of first and second data switches 261, 266 in a (m+1)th row, and therefore a plurality of data signals can be written into a plurality of second storage units 268 in the (m+1)th row via the data lines 230. During an interval T6, the gate signal SGm+2 is switching to low voltage level while the gate signal SGm+1 retains high voltage level, and therefore the second data switches 266 of the (m+1)th row are switching to turn-off state while the first data switches 261 of the (m+1)th row retain turn-on state. Accordingly, a plurality of data signals can be written into the first storage units 263 of the (m+1)th row via the data lines 230; meanwhile, the data signals stored in the second storage units 268 of the (m+1)th row are retained.

Figure 5:
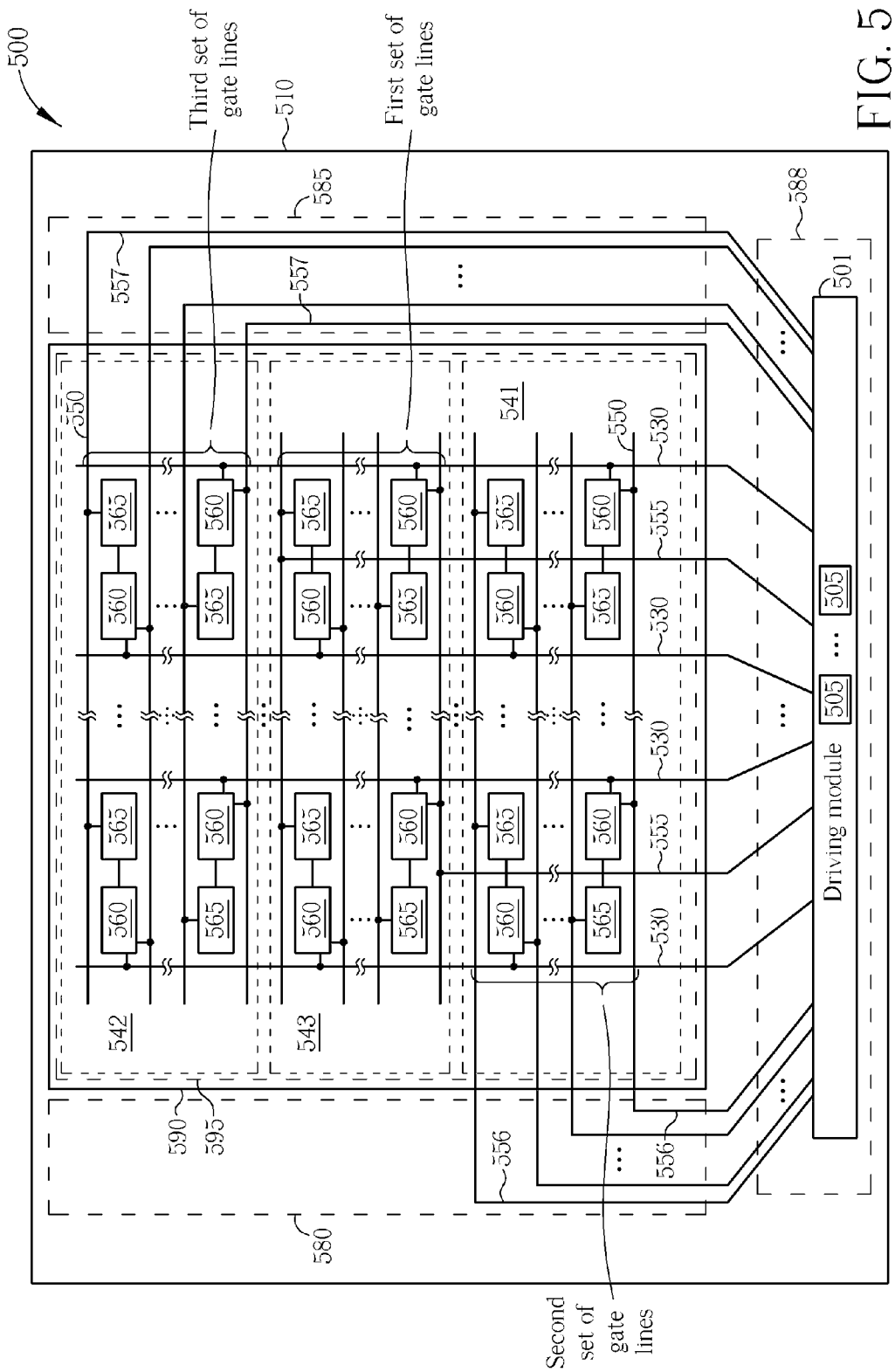
FIG. 5 is a schematic diagram showing a liquid crystal display in accordance with a third embodiment of the present invention.

FIG. 5 is a schematic diagram showing a liquid crystal display in accordance with a third embodiment of the present invention. As shown in FIG. 5, the liquid crystal display 500 comprises a bottom substrate 510, a top substrate 590 positioned on top of the bottom substrate 510, and a liquid crystal layer (not shown) encapsulated between the bottom substrate 510 and the top substrate 590. The top substrate 590 can be a color filter employed to display color images. The bottom substrate 510 comprises a plurality of parallel data lines 530, a plurality of parallel gate lines 550, a plurality of parallel first auxiliary gate lines 555, a plurality of parallel second auxiliary gate lines 556, a plurality of parallel third auxiliary gate lines 557, a plurality of first pixel units 560, a plurality of second pixel units 565, a first border area 580, a second border area 585, a third border area 588, a display area 595 and a driving module 501. The first border area 580, the second border area 585 and the third border area 588 are substantially surrounding the display area 595. For instance, the first border area 580, the second border area 585 and the third border area 588 are substantially adjacent to three edges of the display area 595. The data lines 530, the gate lines 550, the first pixel units 560, the second pixel units 565 and the first auxiliary gate lines 555 are disposed in the display area 595. The driving module 501 is disposed in the third border area 588. The gate lines 550 are substantially crossed with the data lines 530 perpendicularly.

The gate lines 550 comprise a first set of gate lines 550, a second set of gate lines 550 and a third set of gate lines 550. The second set of gate lines 550 is disposed in a first internal area 541 of the display area 595. The first internal area 541 is adjacent to the third border area 588. The third set of gate lines 550 is disposed in a second internal area 542 of the display area 595. The first set of gate lines 550 is disposed in a third internal area 543 of the display area 595. The first internal area 541 is surrounded by the third internal area 543, the first border area 580, the second border area 585 and the third border area 588. The third internal area 543 is surrounded by the second internal area 542, the first border area 580, the second border area 585 and the first internal area 541. The first auxiliary gate lines 555 are substantially parallel with the data lines 530. Each first auxiliary gate line 555 is electrically connected to one corresponding gate line 550 of the first set of gate lines 550. The second auxiliary gate lines 556, disposed in the first border area 580, are substantially parallel with the data lines 530. Each second auxiliary gate line 556 is electrically connected to one corresponding gate line 550 of the second set of gate lines 550. The third auxiliary gate lines 557, disposed in the second border area 585, are substantially parallel with the data lines 530. Each third auxiliary gate line 557 is electrically connected to one corresponding gate line 550 of the third set of gate lines 550. In other words, each gate line 550 is electrically connected to one first auxiliary gate line 555, one second auxiliary gate line 556, or one third auxiliary gate line 557.

The driving module 501 is electrically connected to the data lines 530 so that a plurality of data signals provided can be furnished to the first pixel units 560 and the second pixel units 565 via the data lines 530. The driving module 501 is further electrically connected to the first auxiliary gate lines 555, the second auxiliary gate lines 556 and the third auxiliary gate lines 557 so that a plurality of gate signals provided can be furnished to the gate lines 550 via the first auxiliary gate lines 555, the second auxiliary gate lines 556 and the third auxiliary gate lines 557. The liquid crystal display 500 makes use of the gate signals for providing a control of writing the data signals into the first pixel units 560 and the second pixel units 565 so as to illustrate images.

In one embodiment, the driving module 501 comprises at least one driver 505 for providing the data signals to the data lines 530 and also for providing the gate signals to the first auxiliary gate lines 555, the second auxiliary gate lines 556 and the third auxiliary gate lines 557. In another embodiment, the driving module 501 comprises a plurality of drivers 505. The drivers 505 comprise at least one source driver and at least one gate driver. The source driver is electrically connected to the data lines 530 for providing the data signals. The gate driver is electrically connected to the first auxiliary gate lines 555, the second auxiliary gate lines 556 and the third auxiliary gate lines 557 for providing the gate signals to the gate lines 550. Alternatively, the drivers 505 may comprise at least one source driver, at least one first gate driver, at least one second gate driver and at least one third gate driver. The first gate driver is employed to provide a plurality of first gate signals to the first auxiliary gate lines 555. The second gate driver is employed to provide a plurality of second gate signals to the second auxiliary gate lines 556. The third gate driver is employed to provide a plurality of third gate signals to the third auxiliary gate lines 557. The gate signal waveforms regarding the operation of the liquid crystal display 500 are identical to the signal waveforms shown in FIG. 4, and for the sake of brevity, further similar discussion thereof is omitted.

Since the first auxiliary gate lines 555 are disposed in the display area 595, the numbers of the second auxiliary gate lines 556 and the third auxiliary gate lines 557, respectively disposed in the first border area 580 and the second border area 585, can be lowered significantly, and therefore the widths of the first border area 580 and the second border area 585 are significantly narrowed for reducing the size of the bottom substrate 510. For that reason, the liquid crystal display 500 is also suitable for use as a small-size display installed in any portable electronic device.

Figure 6:
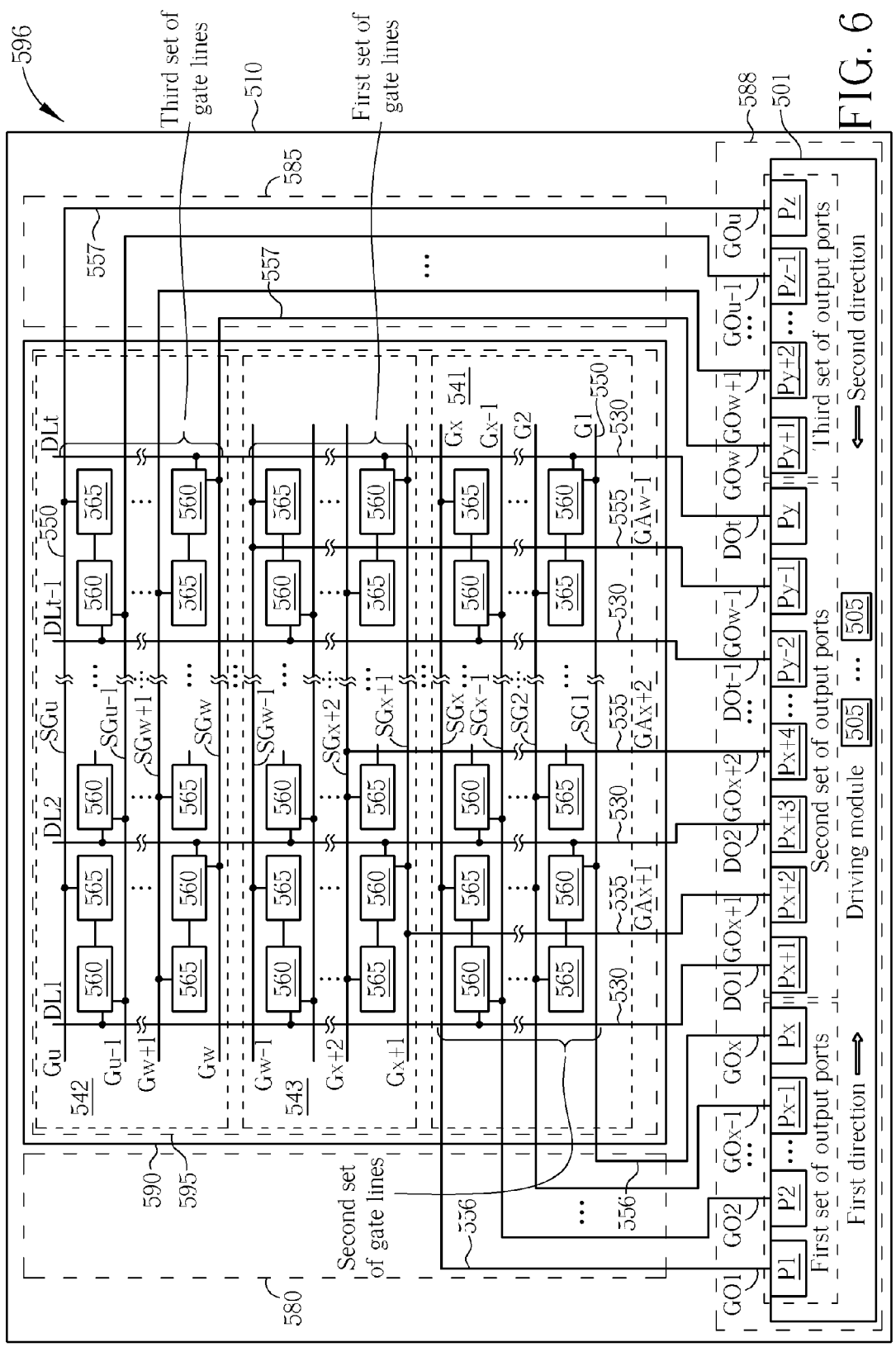
FIG. 6 is a schematic diagram showing a liquid crystal display in accordance with a fourth embodiment of the present invention.

FIG. 6 is a schematic diagram showing a liquid crystal display in accordance with a fourth embodiment of the present invention. As shown in FIG. 6, the circuit structure of the liquid crystal display 596 is similar to that of the liquid crystal display 500 shown in FIG. 5. The driving module 501 further comprises a first of output ports, a second set of output ports and a third set of output ports. The first set of output ports comprises a plurality of first output ports P1~Px for outputting a plurality of first gate signals GO1~GOx. The second set of output ports comprises a plurality of data output ports Px+1, Px+3~Py−2, and Py for outputting a plurality of data signals DO1, DO2~DOt−1, and DOt. The second set of output ports further comprises a plurality of second output ports Px+2, Px+4~Py−1 for outputting a plurality of second gate signals GOx+1, GOx+2~GOw−1. The third set of output ports comprises a plurality of third output ports Py+1, Py+2~Pz−1, Pz for outputting a plurality of third gate signals GOw, GOw+1~GOu−1, GOu. The second auxiliary gate lines 556 are electrically connected to the first set of output ports. The first auxiliary gate lines 555 and the data lines 530 are electrically connected to the second set of output ports. The third auxiliary gate lines 557 are electrically connected to the third set of output ports. That is, the first output ports P1~Px are electrically connected to the second set of gate lines via the second auxiliary gate lines 556, the second output ports Px+2, Px+4~Py−1 are electrically connected to the first set of gate lines via the first auxiliary gate lines 555, and the third output ports Py+1, Py+2~Pz−1, Pz are electrically connected to the third set of gate lines via the third auxiliary gate lines 557.

Please continue referring to FIG. 6, the data output ports Px+1~Py and the second output ports Px+2~Py−1 of the second set of output ports are disposed in the driving module 501 based on interlace arrangement and along a first direction sequentially. That is, the data lines DL1~DLt and the first auxiliary gate lines GAx+1~GAw−1 are electrically connected respectively to the data output ports Px+1~Py and the second output ports Px+2~Py−1 interleaving each other and along the first direction sequentially. For instance, the data output port Px+1 is electrically connected to the data line DL1, the second output port Px+2 is electrically connected to the gate line Gx+1 via the first auxiliary gate line GAx+1, the data output port Px+3 is electrically connected to the data line DL2, the second output port Px+4 is electrically connected to the gate line Gx+2 via the first auxiliary gate line GAx+2, the data output port Py−2 is electrically connected to the data line DLt−1, the second output port Py−1 is electrically connected to the gate line Gw−1 via the first auxiliary gate line GAw−1, and the data output port Py is electrically connected to the data line DLt.

The gate lines G1~Gx of the second set of gate lines are electrically connected to the first output ports Px~P1 of the first set of output ports along a second direction sequentially. For instance, the first output port P1 is electrically connected to the gat line Gx, the first output port P2 is electrically connected to the gat line Gx−1, the first output port Px−1 is electrically connected to the gat line G2, and the first output port Px is electrically connected to the gat line G1. The gate lines Gw~Gu of the third set of gate lines are electrically connected to the third output ports Py+1~Pz of the third set of output ports along the first direction sequentially. For instance, the third output port Py+1 is electrically connected to the gat line Gw, the third output port Py+2 is electrically connected to the gat line Gw+1, the third output port Pz−1 is electrically connected to the gat line Gu−1, and the third output port Pz is electrically connected to the gat line Gu.

Figure 7:
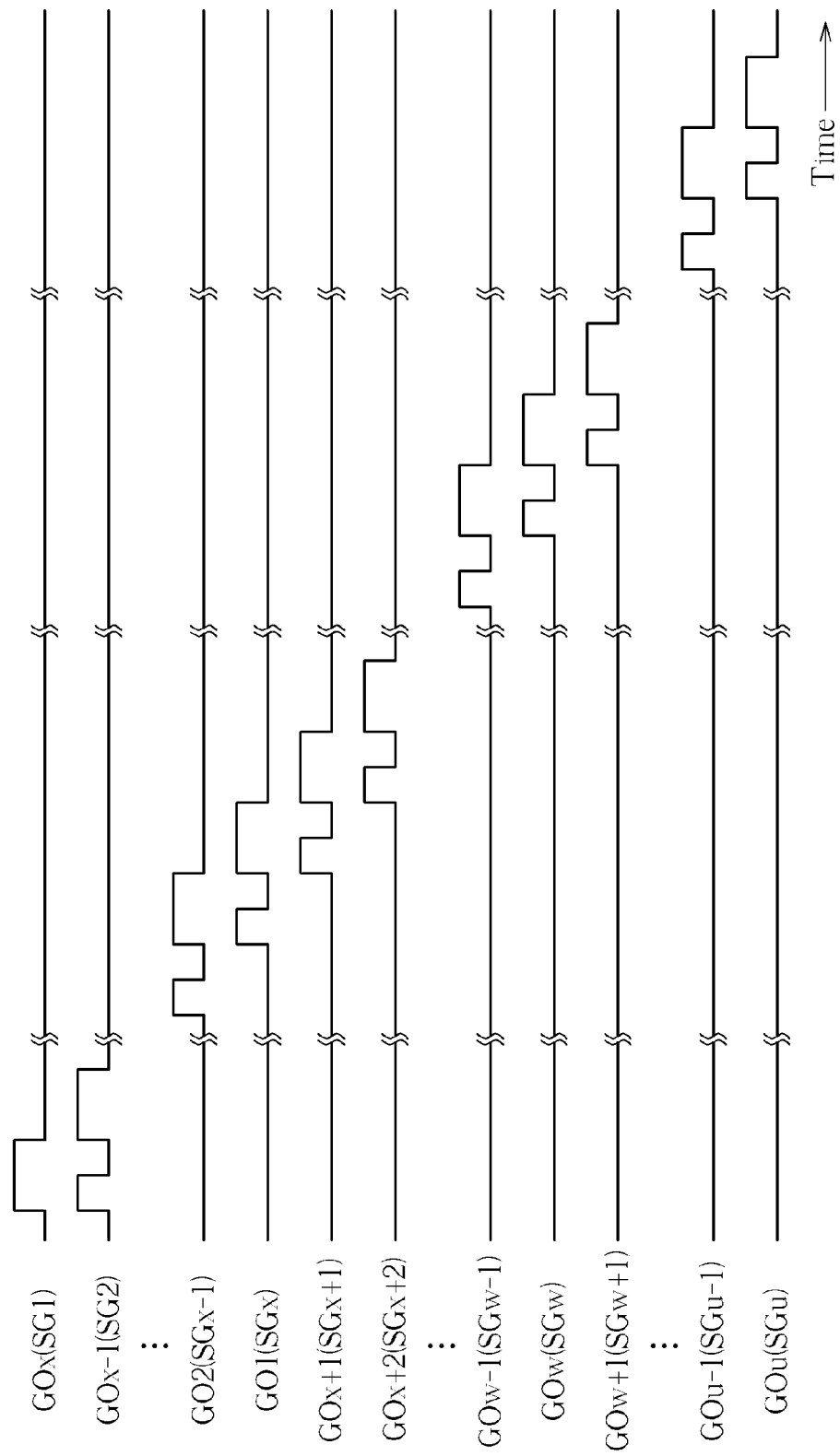
FIG. 7 is a schematic diagram showing gate signal waveforms regarding the operation of the liquid crystal display shown in FIG. 6, having time along the abscissa.

FIG. 7 is a schematic diagram showing gate signal waveforms regarding the operation of the liquid crystal display shown in FIG. 6, having time along the abscissa. The gate signal waveforms in FIG. 7, from top to bottom, are the first gate signal GOx (SG1), the first gate signal GOx−1 (SG2), . . . , the first gate signal GO2 (SGx−1), the first gate signal GO1 (SGx), the second gate signal GOx+1 (SGx+1), the second gate signal GOx+2 (SGx+2), . . . , the second gate signal GOw−1 (SGw−1), the third gate signal GOw (SGw), the third gate signal GOw+1 (SGw+1), . . . , the third gate signal GOu−1 (SGu−1), and the third gate signal GOu (SGu). In general, the gate lines 550 are sequentially driven from the first gate line G1 to the last gate line Gu, i.e. the driving module 501 is employed to furnish enable signal sequentially to the gate lines G1~Gu.

According to the electrical connection relationship between the output ports P1~Pz and the gate lines G1~Gu shown in FIG. 6, while performing driving operations sequentially from the first gate line G1 to the last gate line Gu, the first gate signals GOx~GO1 are sequentially outputted from the first output ports Px~P1, i.e. along a first sequence corresponding to the second direction regarding the first set of output ports, forward to the second set of gate lines via the second auxiliary gate lines 556. The second gate signals GOx+1~GOw−1 are sequentially outputted from the second output ports Px+2~Py−1, i.e. along a second sequence corresponding to the first direction regarding the second set of output ports, forward to the first set of gate lines via the first auxiliary gate lines 555. The third gate signals GOw~GOu are sequentially outputted from the third output ports Py+1~Pz, i.e. along a third sequence corresponding to the first direction regarding the third set of output ports, forward to the third set of gate lines via the third auxiliary gate lines 557.

Figure 8:
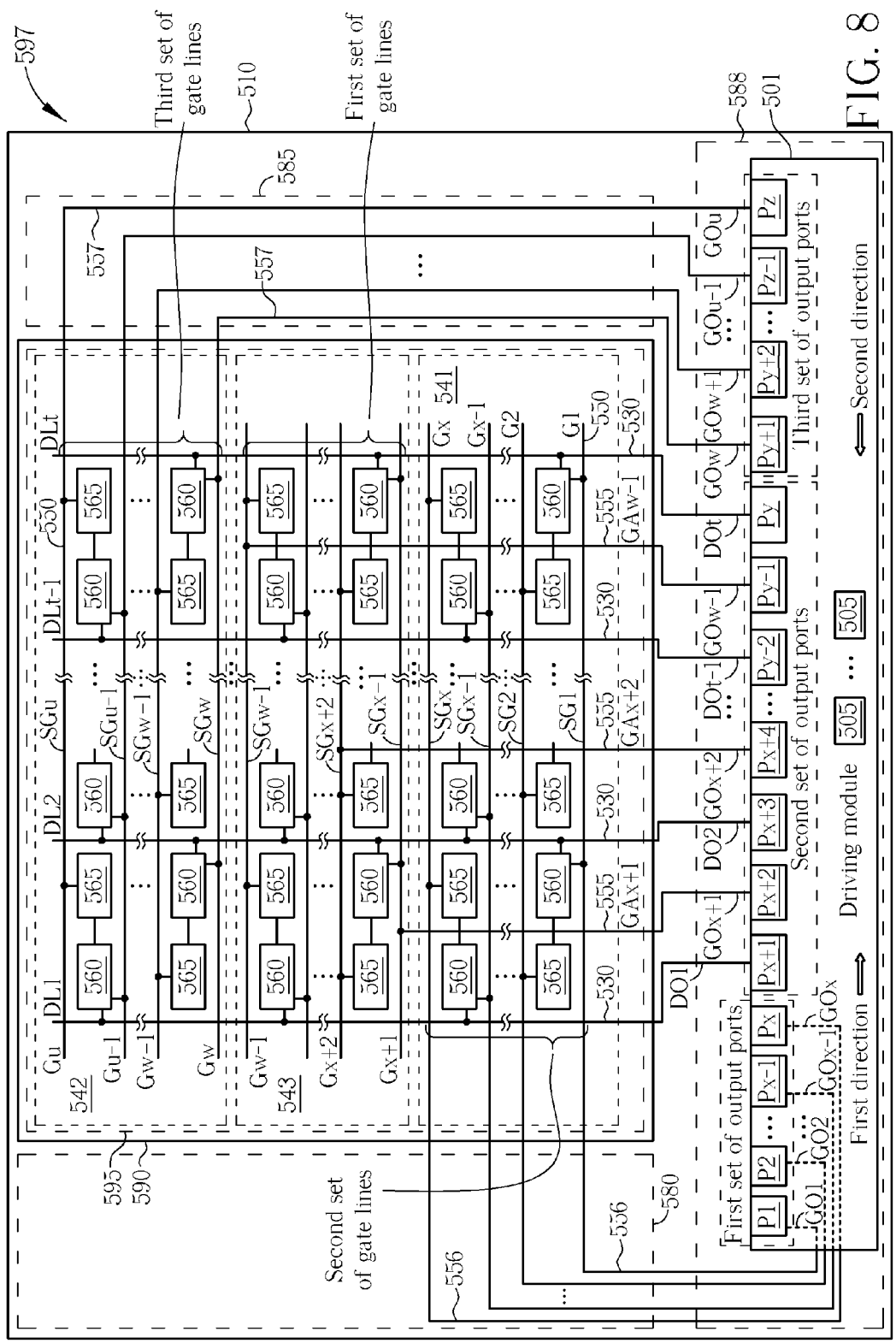
FIG. 8 is a schematic diagram showing a liquid crystal display in accordance with a fifth embodiment of the present invention.

FIG. 8 is a schematic diagram showing a liquid crystal display in accordance with a fifth embodiment of the present invention. As shown in FIG. 8, the circuit structure of the liquid crystal display 597 is similar to that of the liquid crystal display 596 shown in FIG. 6, differing only in that the electrical connection relationship between the first output ports P1~Px of the first set of output ports and the gate lines G1~Gx of the second set of gate lines. The second set of gate lines in both the liquid crystal display 597 and the liquid crystal display 596 are electrically connected to the first set of output ports via the second auxiliary gate lines 556. However, the gate lines G1~Gx of the second set of gate lines are electrically connected to the first output ports P1~Px of the first set of output ports sequentially along the first direction in the liquid crystal display 597. For instance, the first output port P1 is electrically connected to the gat line G1, the first output port P2 is electrically connected to the gate line G2, the first output port Px−1 is electrically connected to the gat line Gx−1, and the first output port Px is electrically connected to the gat line Gx. Other circuit structures of the liquid crystal display 597 are identical to those of the liquid crystal display 596 shown in FIG. 6, and for the sake of brevity, further similar discussion thereof is omitted.

Figure 9:
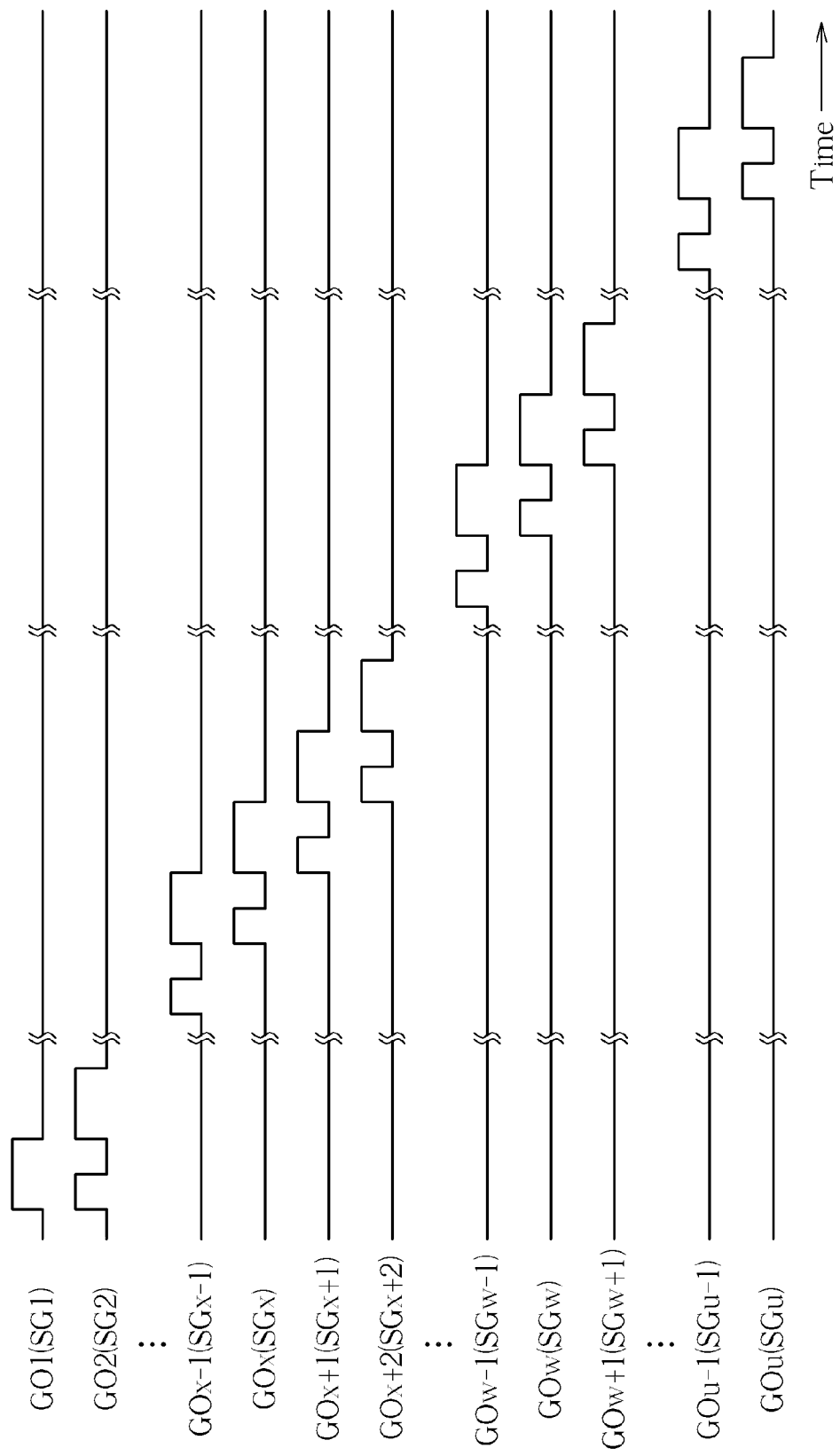
FIG. 9 is a schematic diagram showing gate signal waveforms regarding the operation of the liquid crystal display shown in FIG. 8, having time along the abscissa.

FIG. 9 is a schematic diagram showing gate signal waveforms regarding the operation of the liquid crystal display shown in FIG. 8, having time along the abscissa. The gate signal waveforms in FIG. 9, from top to bottom, are the first gate signal GO1 (SG1), the first gate signal GO2 (SG2), . . . , the first gate signal GOx−1 (SGx−1), the first gate signal GOx (SGx), the second gate signal GOx+1 (SGx+1), the second gate signal GOx+2 (SGx+2), . . . , the second gate signal GOw−1 (SGw−1), the third gate signal GOw (SGw), the third gate signal GOw+1 (SGw+1), . . . , the third gate signal GOu−1 (SGu−1), and the third gate signal GOu (SGu). Similarly, the gate lines 550 are sequentially driven from the first gate line G1 to the last gate line Gu, i.e. the driving module 501 is employed to furnish enable signal sequentially to the gate lines G1~Gu.

According to the electrical connection relationship between the output ports P1~Pz and the gate lines G1~Gu shown in FIG. 8, while performing driving operations sequentially from the first gate line G1 to the last gate line Gu, the first gate signals GO1~GOx are sequentially outputted from the first output ports P1~Px, i.e. along a first sequence corresponding to the first direction regarding the first set of output ports, forward to the second set of gate lines via the second auxiliary gate lines 556. The second gate signals GOx+1~GOw−1 are sequentially outputted from the second output ports Px+2~Py−1, i.e. along a second sequence corresponding to the first direction regarding the second set of output ports, forward to the first set of gate lines via the first auxiliary gate lines 555. The third gate signals GOw~GOu are sequentially outputted from the third output ports Py+1~Pz, i.e. along a third sequence corresponding to the first direction regarding the third set of output ports, forward to the third set of gate lines via the third auxiliary gate lines 557.

Figure 10:
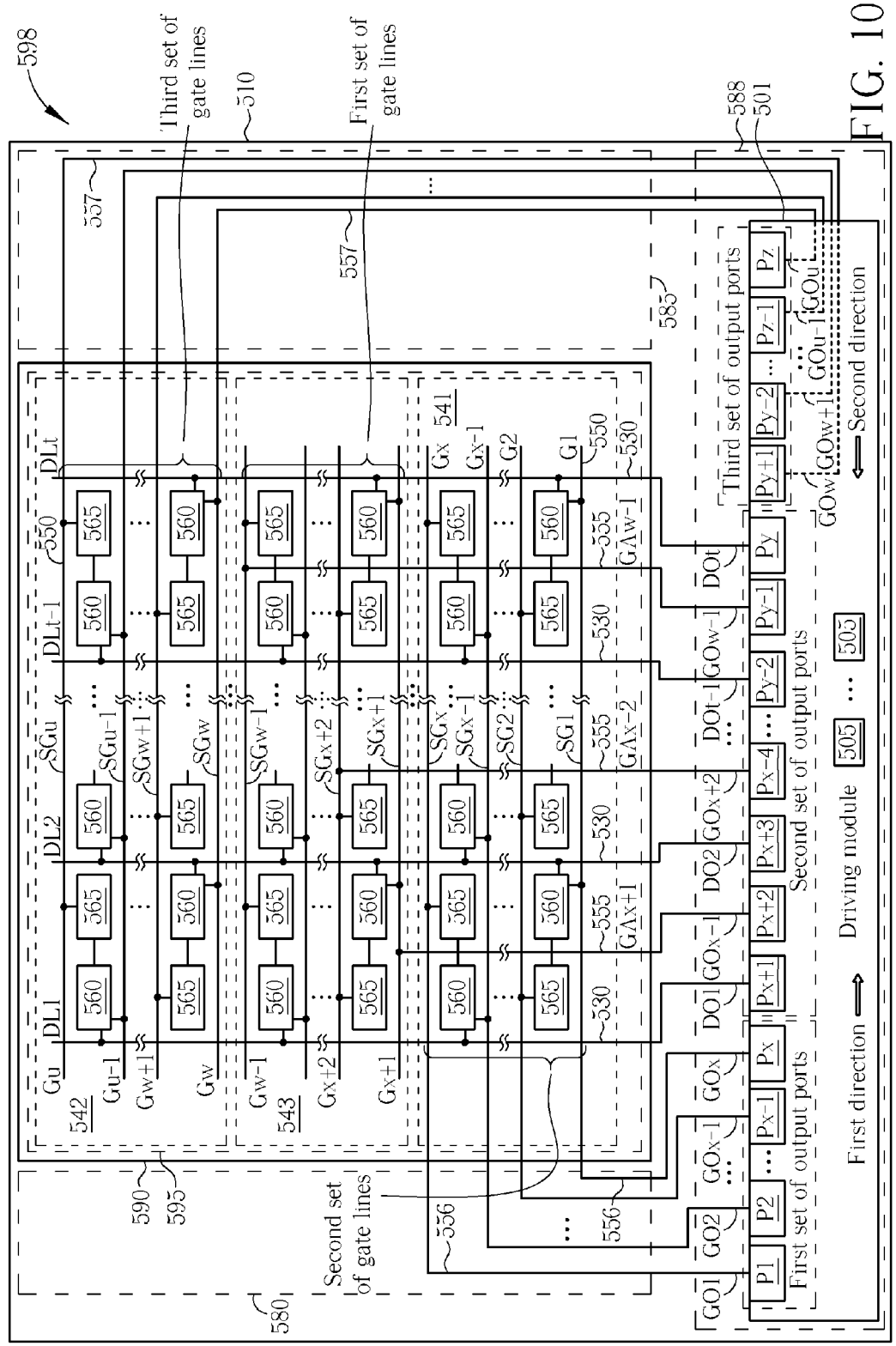
FIG. 10 is a schematic diagram showing a liquid crystal display in accordance with a sixth embodiment of the present invention.

FIG. 10 is a schematic diagram showing a liquid crystal display in accordance with a sixth embodiment of the present invention. As shown in FIG. 10, the circuit structure of the liquid crystal display 598 is similar to that of the liquid crystal display 596 shown in FIG. 6, differing only in that the electrical connection relationship between the third output ports Py+1~Pz of the third set of output ports and the gate lines Gw~Gu of the third set of gate lines. The third set of gate lines in both the liquid crystal display 598 and the liquid crystal display 596 are electrically connected to the third set of output ports via the third auxiliary gate lines 557. However, the gate lines Gw~Gu of the third set of gate lines are electrically connected to the third output ports Pz~Py+1 of the third set of output ports sequentially along the second direction regarding in the liquid crystal display 598. For instance, the third output port Py+1 is electrically connected to the gat line Gu, the third output port Py+2 is electrically connected to the gat line Gu−1, the third output port Pz−1 is electrically connected to the gat line Gw+1, and the third output port Pz is electrically connected to the gat line Gw. Other circuit structures of the liquid crystal display 598 are identical to those of the liquid crystal display 596 shown in FIG. 6, and for the sake of brevity, further similar discussion thereof is omitted.

Figure 11:
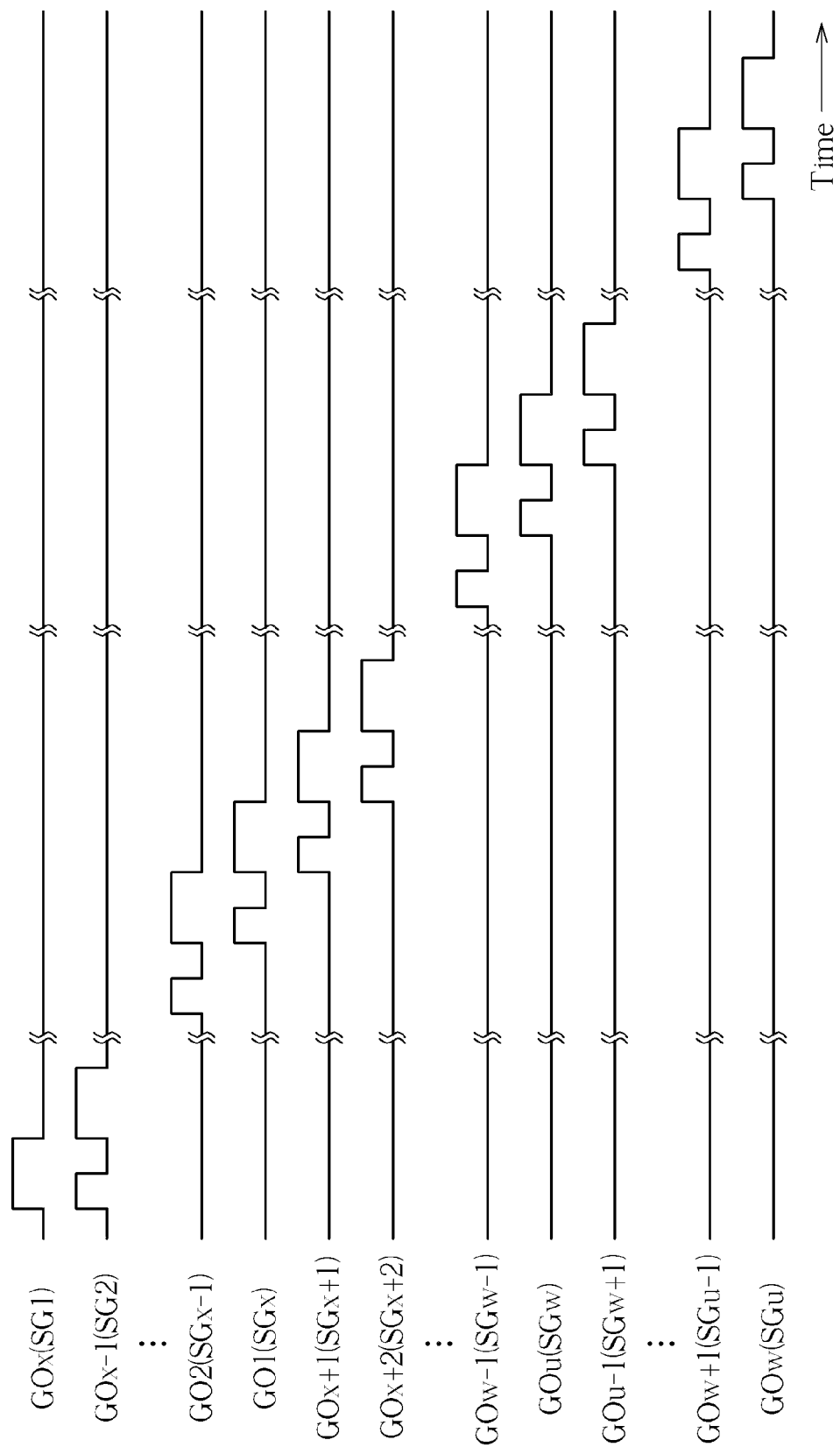
FIG. 11 is a schematic diagram showing gate signal waveforms regarding the operation of the liquid crystal display shown in FIG. 10, having time along the abscissa.

FIG. 11 is a schematic diagram showing gate signal waveforms regarding the operation of the liquid crystal display shown in FIG. 10, having time along the abscissa. The gate signal waveforms in FIG. 11, from top to bottom, are the first gate signal GOx (SG1), the first gate signal GOx−1 (SG2), . . . , the first gate signal GO2 (SGx−1), the first gate signal GO1 (SGx), the second gate signal GOx+1 (SGx+1), the second gate signal GOx+2 (SGx+2), . . . , the second gate signal GOw−1 (SGw−1), the third gate signal GOu (SGw), the third gate signal GOu−1 (SGw+1), . . . , the third gate signal GOw+1 (SGu−1), and the third gate signal GOw (SGu). Similarly, the gate lines 550 are sequentially driven from the first gate line G1 to the last gate line Gu, i.e. the driving module 501 is employed to furnish enable signal sequentially to the gate lines G1~Gu.

According to the electrical connection relationship between the output ports P1~Pz and the gate lines G1~Gu shown in FIG. 10, while performing driving operations sequentially from the first gate line G1 to the last gate line Gu, the first gate signals GOx~GO1 are sequentially outputted from the first output ports Px~P1, i.e. along a first sequence corresponding to the second direction regarding the first set of output ports, forward to the second set of gate lines via the second auxiliary gate lines 556. The second gate signals GOx+1~GOw−1 are sequentially outputted from the second output ports Px+2~Py−1, i.e. along a second sequence corresponding to the first direction regarding the second set of output ports, forward to the first set of gate lines via the first auxiliary gate lines 555. The third gate signals GOu~GOw are sequentially outputted from the third output ports Pz~Py+1, i.e. along a third sequence corresponding to the second direction regarding the third set of output ports, forward to the third set of gate lines via the third auxiliary gate lines 557.

Figure 12:
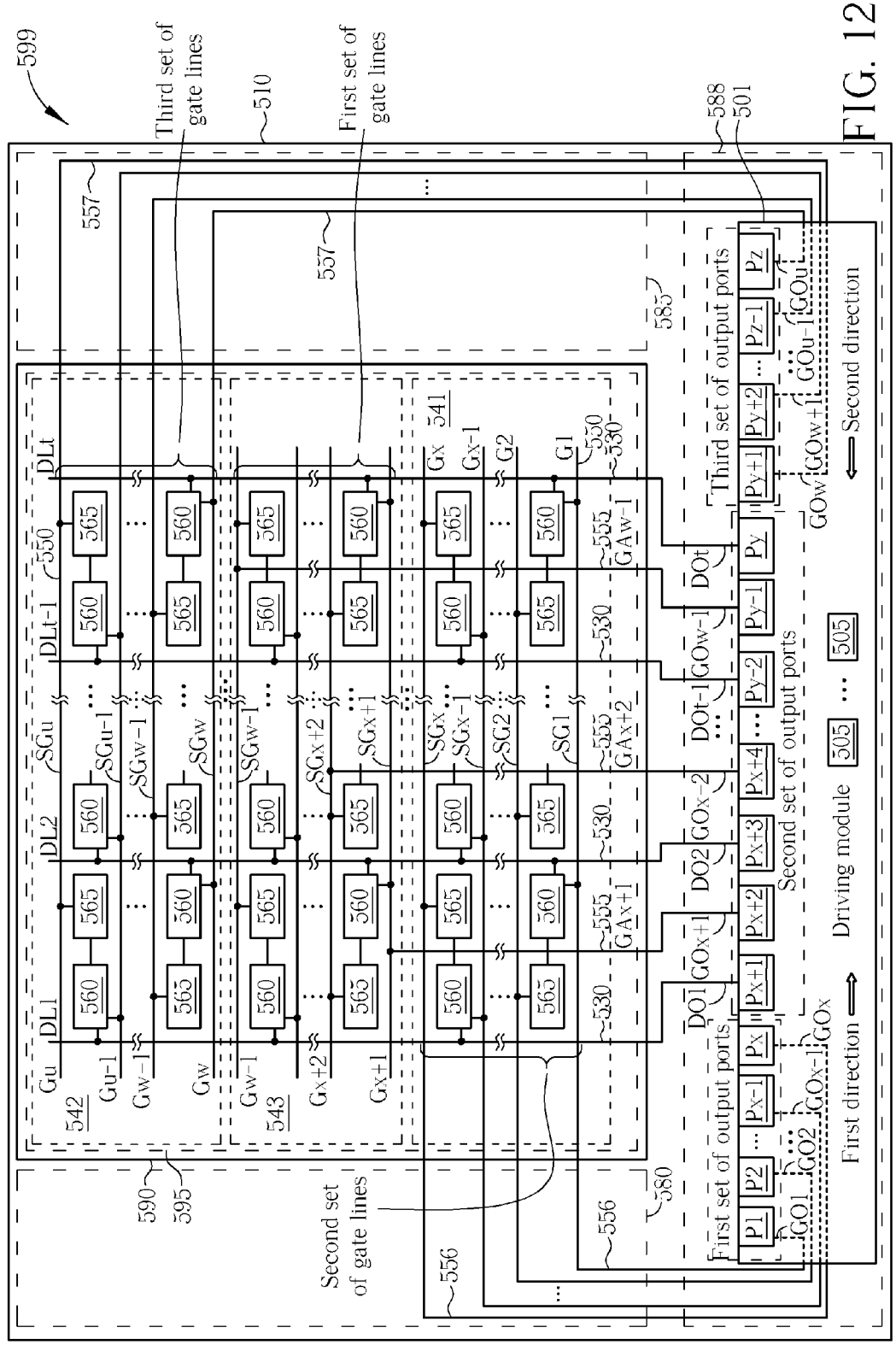
FIG. 12 is a schematic diagram showing a liquid crystal display in accordance with a seventh embodiment of the present invention.

FIG. 12 is a schematic diagram showing a liquid crystal display in accordance with a seventh embodiment of the present invention. As shown in FIG. 12, the circuit structure of the liquid crystal display 599 is similar to that of the liquid crystal display 598 shown in FIG. 10, differing only in that the electrical connection relationship between the first output ports P1~Px of the first set of output ports and the gate lines G1~Gx of the second set of gate lines. The second set of gate lines in both the liquid crystal display 599 and the liquid crystal display 598 are electrically connected to the first set of output ports via the second auxiliary gate lines 556. However, the gate lines G1~Gx of the second set of gate lines are electrically connected to the first output ports P1~Px of the first set of output ports sequentially along the first direction in the liquid crystal display 599. For instance, the first output port P1 is electrically connected to the gat line G1, the first output port P2 is electrically connected to the gat line G2, the first output port Px−1 is electrically connected to the gat line Gx−1, and the first output port Px is electrically connected to the gat line Gx. Other circuit structures of the liquid crystal display 599 are identical to those of the liquid crystal display 598 shown in FIG. 10, and for the sake of brevity, further similar discussion thereof is omitted.

Figure 13:
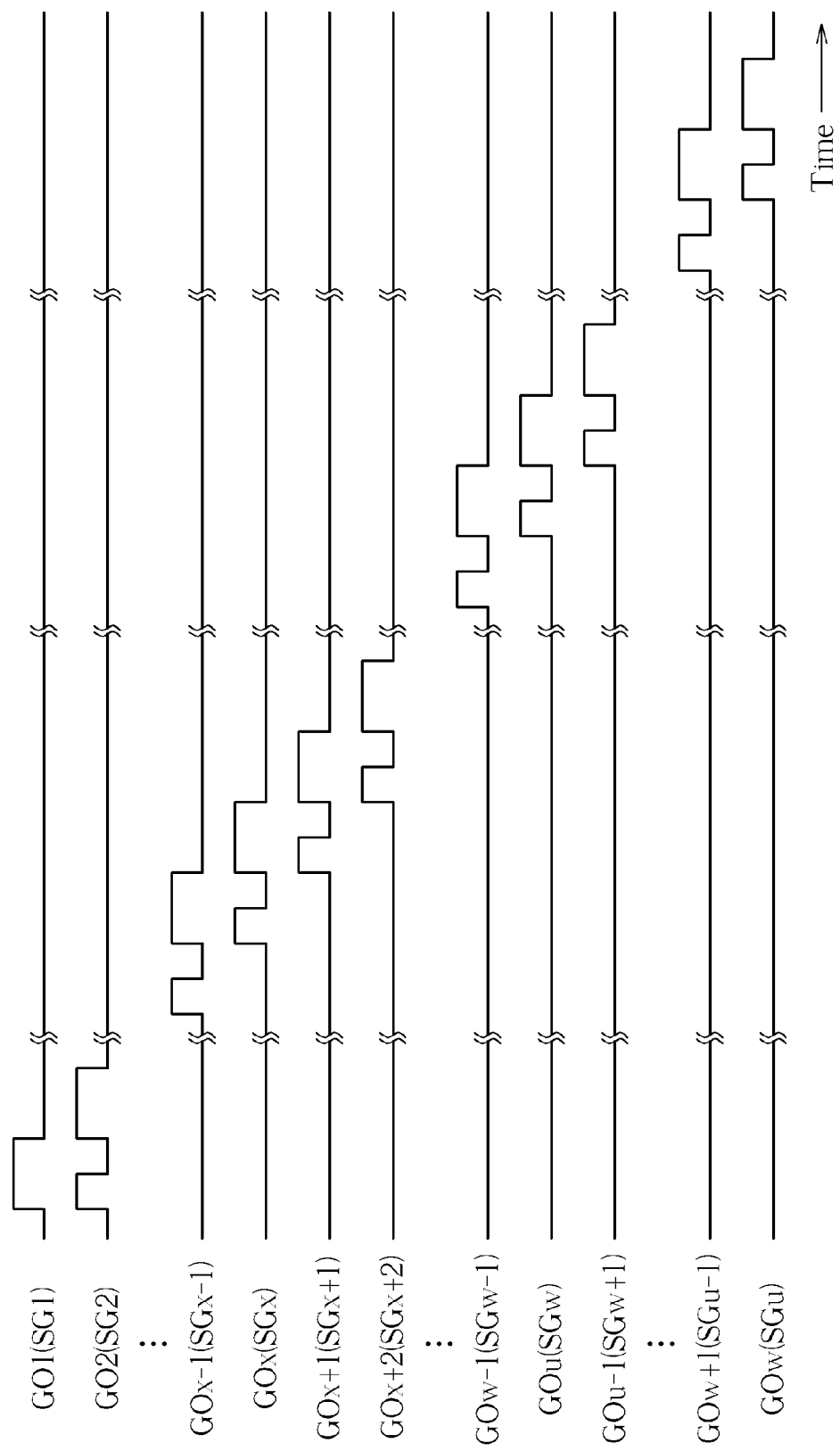
FIG. 13 is a schematic diagram showing gate signal waveforms regarding the operation of the liquid crystal display shown in FIG. 12, having time along the abscissa.

FIG. 13 is a schematic diagram showing gate signal waveforms regarding the operation of the liquid crystal display shown in FIG. 12, having time along the abscissa. The gate signal waveforms in FIG. 13, from top to bottom, are the first gate signal GO1 (SG1), the first gate signal GO2 (SG2), ..., the first gate signal GOx−1 (SGx−1), the first gate signal GOx (SGx), the second gate signal GOx+1 (SGx+1), the second gate signal GOx+2 (SGx+2), ..., the second gate signal GOw−1 (SGw−1), the third gate signal GOu (SGw), the third gate signal GOu−1 (SGw+1), ..., the third gate signal GOw+1 (SGu−1), and the third gate signal GOw (SGu). Similarly, the gate lines 550 are sequentially driven from the first gate line G1 to the last gate line Gu, i.e. the driving module 501 is employed to furnish enable signal sequentially to the gate lines G1~Gu.

According to the electrical connection relationship between the output ports P1~Pz and the gate lines G1~Gu shown in FIG. 12, while performing driving operations sequentially from the first gate line G1 to the last gate line Gu, the first gate signals GO1~GOx are sequentially outputted from the first output ports P1~Px, i.e. along a first sequence corresponding to the first direction regarding the first set of output ports, forward to the second set of gate lines via the second auxiliary gate lines 556. The second gate signals GOx+1~GOw−1 are sequentially outputted from the second output ports Px+2~Py−1, i.e. along a second sequence corresponding to the first direction regarding the second set of output ports, forward to the first set of gate lines via the first auxiliary gate lines 555. The third gate signals GOu~GOw are sequentially outputted from the third output ports Pz~Py+1, i.e. along a third sequence corresponding to the second direction regarding the third set of output ports, forward to the third set of gate lines via the third auxiliary gate lines 557.

Figure 14:
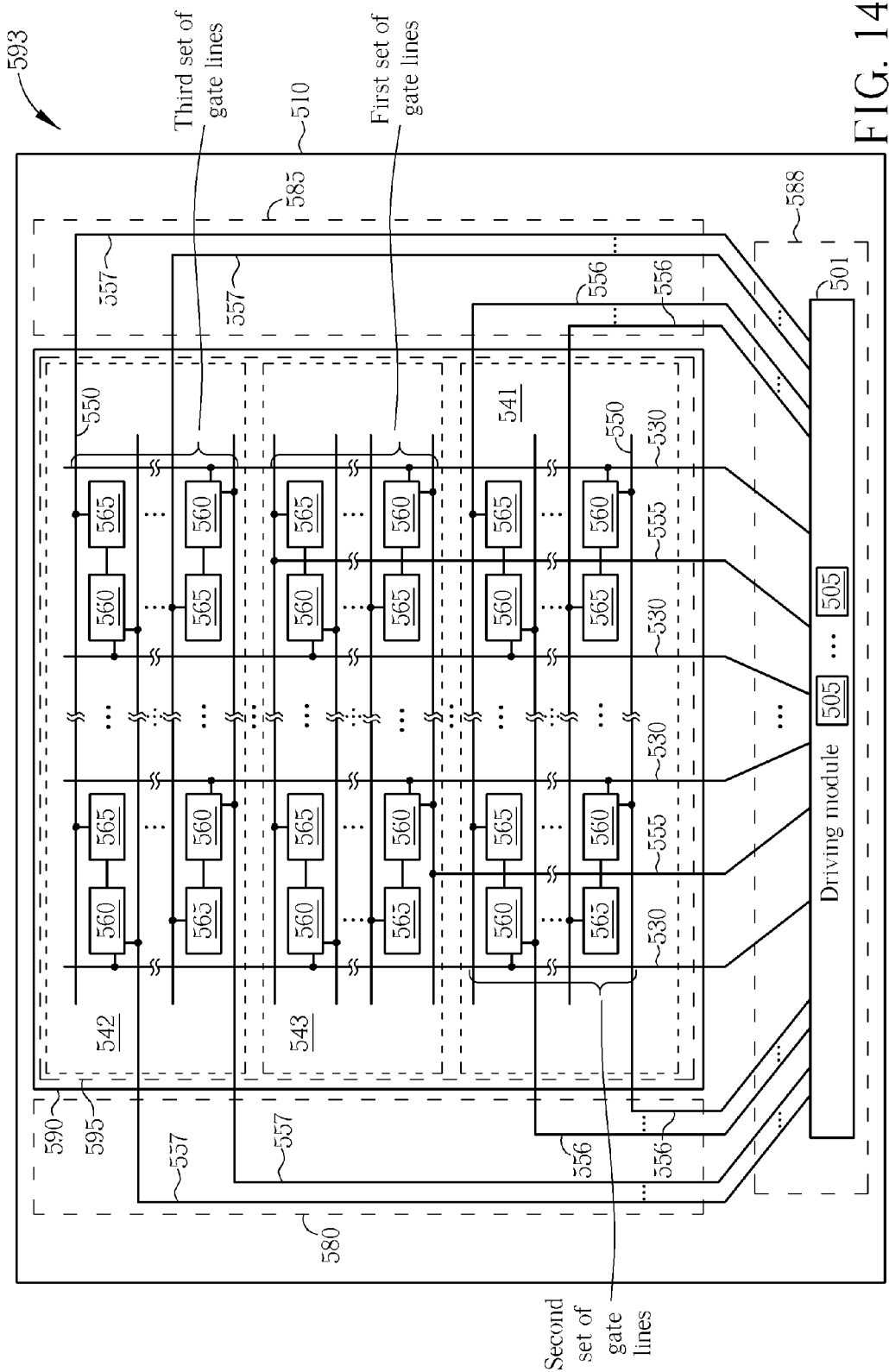
FIG. 14 is a schematic diagram showing a liquid crystal display in accordance with an eighth embodiment of the present invention.

FIG. 14 is a schematic diagram showing a liquid crystal display in accordance with an eighth embodiment of the present invention. As shown in FIG. 14, the circuit structure of the liquid crystal display 593 is similar to that of the liquid crystal display 500 shown in FIG. 5, differing only in that the second auxiliary gate lines 556 having odd order and the third auxiliary gate lines 557 having odd order are disposed in the first border area 580, and the second auxiliary gate lines 556 having even order and the third auxiliary gate lines 557 having even order are disposed in the second border area 585. The second auxiliary gate lines 556 having odd order are electrically connected to the odd gate lines 550 of the second set of gate lines. The second auxiliary gate lines 556 having even order are electrically connected to the even gate lines 550 of the second set of gate lines. The third auxiliary gate lines 557 having odd order are electrically connected to the odd gate lines 550 of the third set of gate lines. The third auxiliary gate lines 557 having even order are electrically connected to the even gate lines 550 of the third set of gate lines. Other circuit structures of the liquid crystal display 593 are identical to those of the liquid crystal display 500 shown in FIG. 5, and the gate signal driving method of the liquid crystal display 593 can be inferred based on the gate signal driving methods of the fourth through seventh embodiments by analogy.

In another embodiment, the second auxiliary gate lines 556 having odd order are electrically connected to the even gate lines 550 of the second set of gate lines, the second auxiliary gate lines 556 having even order are electrically connected to the odd gate lines 550 of the second set of gate lines, the third auxiliary gate lines 557 having odd order are electrically connected to the even gate lines 550 of the third set of gate lines, and the third auxiliary gate lines 557 having even order are electrically connected to the odd gate lines 550 of the third set of gate lines.

Figure 15:
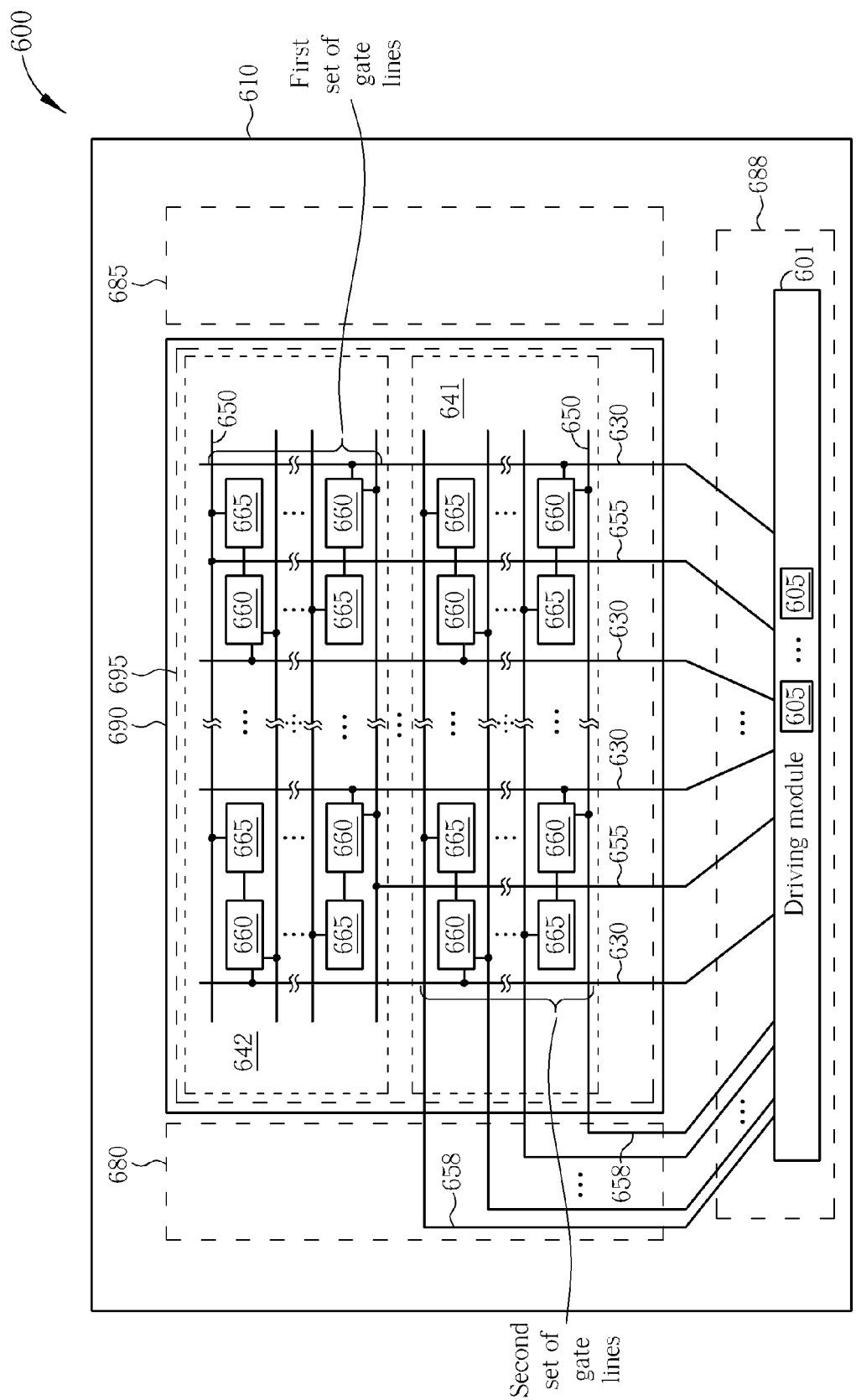
FIG. 15 is a schematic diagram showing a liquid crystal display in accordance with a ninth embodiment of the present invention.

FIG. 15 is a schematic diagram showing a liquid crystal display in accordance with a ninth embodiment of the present invention. As shown in FIG. 15, the liquid crystal display 600 comprises a bottom substrate 610, a top substrate 690 positioned on top of the bottom substrate 610, and a liquid crystal layer (not shown) encapsulated between the bottom substrate 610 and the top substrate 690. The top substrate 690 can be a color filter employed to display color images. The bottom substrate 610 comprises a plurality of parallel data lines 630, a plurality of parallel gate lines 650, a plurality of parallel first auxiliary gate lines 655, a plurality of parallel second auxiliary gate lines 658, a plurality of first pixel units 660, a plurality of second pixel units 665, a first border area 680, a second border area 685, a third border area 688, a display area 695 and a driving module 601. The first border area 680, the second border area 685 and the third border area 688 are substantially surrounding the display area 695. For instance, the first border area 680, the second border area 685 and the third border area 688 are substantially adjacent to three edges of the display area 695. The third border area 688 is disposed substantially between the first border area 680 and the second border area 685. The data lines 630, the gate lines 650, the first pixel units 660, the second pixel units 665 and the first auxiliary gate lines 655 are disposed in the display area 695. The driving module 601 is disposed in the third border area 688. The gate lines 650 are substantially crossed with the data lines 630 perpendicularly.

The gate lines 650 comprise a first set of gate lines and a second set of gate lines. The second set of gate lines comprise a plurality of gate lines 650 disposed in a first internal area 641 of the display area 695. The first internal area 641 of the display area 695 is adjacent to the third border area 688. The first set of gate lines comprise a plurality of gate lines 650 disposed in a second internal area 642 of the display area 695. In the display area 695, the second internal area 642 is opposite to the first internal area 641. The first auxiliary gate lines 655 are substantially parallel with the data lines 630. Each first auxiliary gate line 655 is electrically connected to one corresponding gate line 650 of the first set of gate lines. The second auxiliary gate lines 658 are disposed in the first border area 680 and are substantially parallel with the data lines 630. Each second auxiliary gate line 658 is electrically connected to one corresponding gate line 650 of the second set of gate lines. In other words, each gate line 650 is electrically connected to either one first auxiliary gate line 655 or one second auxiliary gate line 658.

The driving module 601 is electrically connected to the data lines 630 so that a plurality of data signals provided can be furnished to the first pixel units 660 and the second pixel units 665 via the data lines 630. The driving module 601 is further electrically connected to the first auxiliary gate lines 655 and the second auxiliary gate lines 658 so that a plurality of gate signals provided can be furnished to the gate lines 650 via the first auxiliary gate lines 655 and the second auxiliary gate lines 658. The liquid crystal display 600 makes use of the gate signals for providing a control of writing the data signals into the first pixel units 660 and the second pixel units 665 so as to illustrate images. The gate signal driving method of the liquid crystal display 600 can be inferred based on the gate signal driving methods of the fourth through seventh embodiments by analogy.

In one embodiment, the driving module 601 comprises at least one driver 605 for providing the data signals to the data lines 630 and also for providing the gate signals to the first auxiliary gate lines 655 and the second auxiliary gate lines 658. In another embodiment, the driving module 601 comprises a plurality of drivers 605. The drivers 605 comprise at least one source driver and at least one gate driver. The source driver is electrically connected to the data lines 630 for providing the data signals. The gate driver is electrically connected to the first auxiliary gate lines 655 and second auxiliary gate lines 658 for providing the gate signals to the gate lines 650. Alternatively, the drivers 605 comprises at least one source driver, at least one first gate driver and at least one second gate driver. The first gate driver is employed to provide a plurality of first gate signals to the first auxiliary gate lines 655. The second gate driver is employed to provide a plurality of second gate signals to the second auxiliary gate lines 658. The gate signal waveforms regarding the operation of the liquid crystal display 600 are identical to the signal waveforms shown in FIG. 4, and for the sake of brevity, further similar discussion thereof is omitted.

Since the first auxiliary gate lines 655 are disposed in the display area 695, the number of the second auxiliary gate lines 658 disposed in the first border area 680 can be lowered significantly, and therefore the width of the first border area 680 is narrowed significantly. Furthermore, the second border area 685 is not required to dispose any auxiliary gate line, and therefore the width of the second border area 685 is narrowed even more significantly. Accordingly, the size of the bottom substrate 610 can be reduced significantly. For that reason, the liquid crystal display 600 is also suitable for use as a small-size display installed in any portable electronic device.

Figure 16:
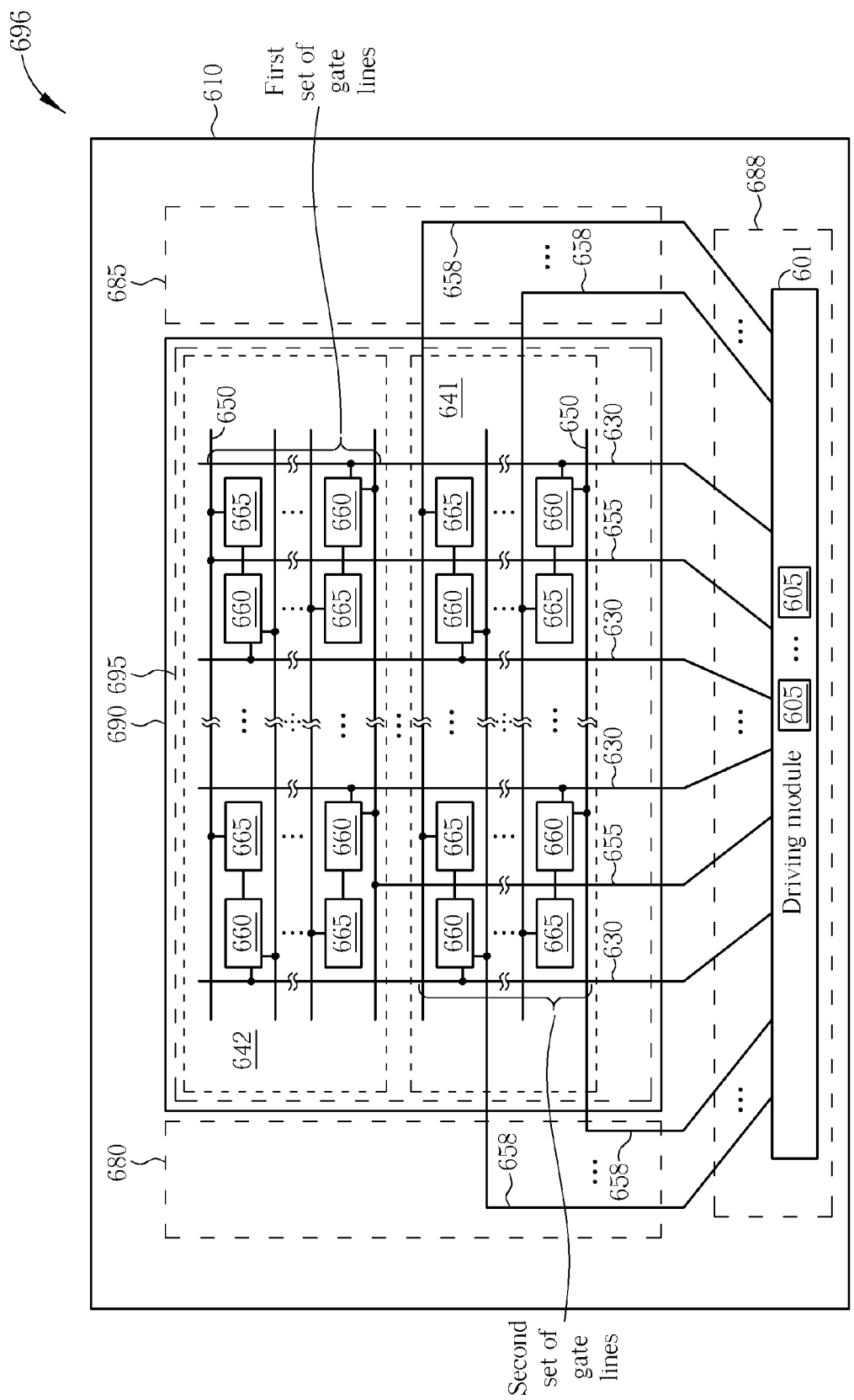
FIG. 16 is a schematic diagram showing a liquid crystal display in accordance with a tenth embodiment of the present invention.

FIG. 16 is a schematic diagram showing a liquid crystal display in accordance with a tenth embodiment of the present invention. As shown in FIG. 16, the circuit structure of the liquid crystal display 696 is similar to that of the liquid crystal display 600 shown in FIG. 15, differing only in that the second auxiliary gate lines 658 having odd order are disposed in the first border area 680 and the second auxiliary gate lines 658 having even order are disposed in the second border area 685. The second auxiliary gate lines 658 having odd order are electrically connected to the odd gate lines 650 of the second set of gate lines. The second auxiliary gate lines 658 having even order are electrically connected to the even gate lines 650 of the second set of gate lines. Other circuit structures of the liquid crystal display 696 are identical to those of the liquid crystal display 600 shown in FIG. 15, and the gate signal driving method of the liquid crystal display 696 can be inferred based on the gate signal driving methods of the fourth through seventh embodiments by analogy.

In another embodiment, the second auxiliary gate lines 658 having odd order are electrically connected to the even gate lines 650 of the second set of gate lines, and the second auxiliary gate lines 658 having even order are electrically connected to the odd gate lines 650 of the second set of gate lines.

Figure 17:
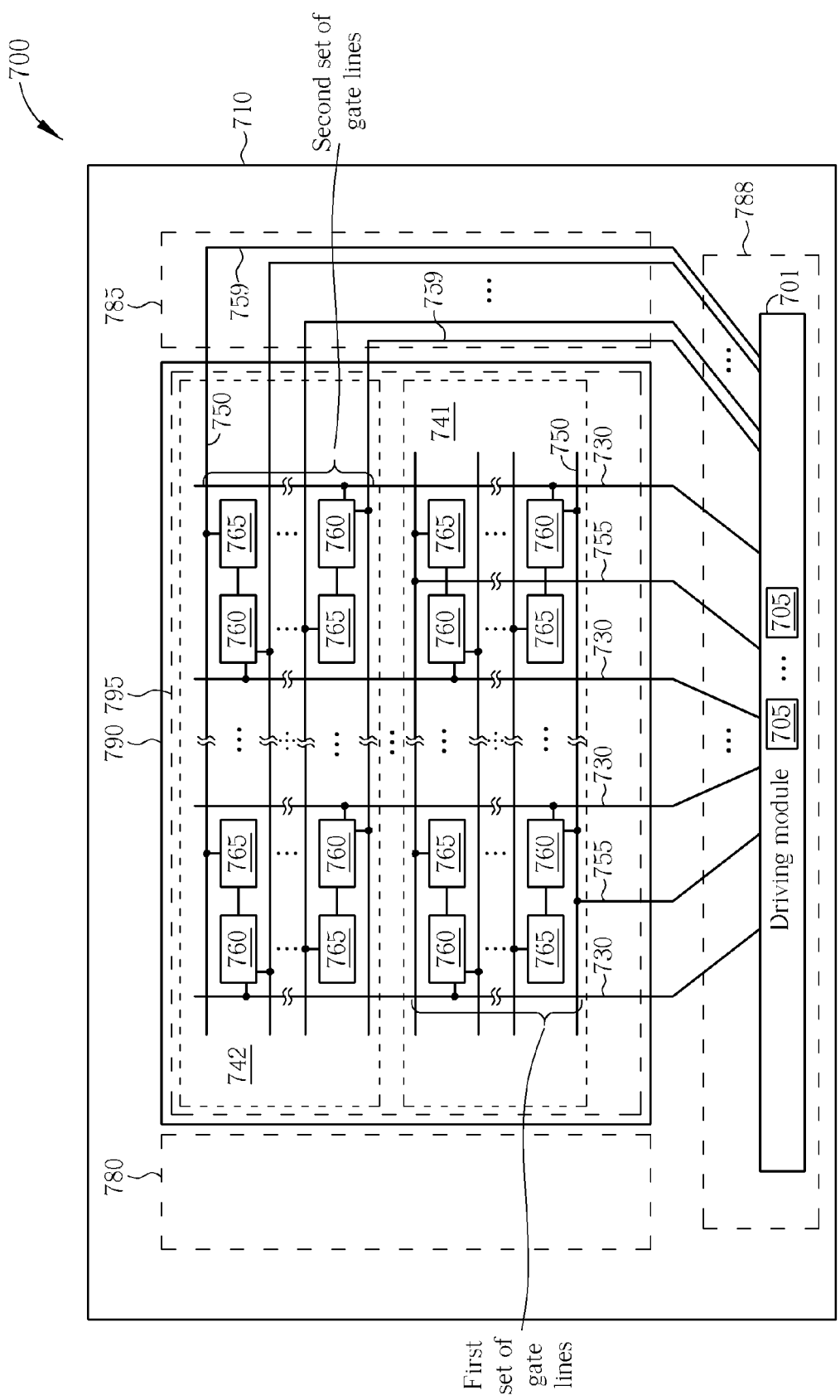
FIG. 17 is a schematic diagram showing a liquid crystal display in accordance with an eleventh embodiment of the present invention.

FIG. 17 is a schematic diagram showing a liquid crystal display in accordance with an eleventh embodiment of the present invention. As shown in FIG. 17, the liquid crystal display 700 comprises a bottom substrate 710, a top substrate 790 positioned on top of the bottom substrate 710, and a liquid crystal layer (not shown) encapsulated between the bottom substrate 710 and the top substrate 790. The top substrate 790 can be a color filter employed to display color images. The bottom substrate 710 comprises a plurality of parallel data lines 730, a plurality of parallel gate lines 750, a plurality of parallel first auxiliary gate lines 755, a plurality of parallel second auxiliary gate lines 759, a plurality of first pixel units 760, a plurality of second pixel units 765, a first border area 780, a second border area 785, a third border area 788, a display area 795 and a driving module 701. The first border area 780, the second border area 785 and the third border area 788 are substantially surrounding the display area 795. For instance, the first border area 780, the second border area 785 and the third border area 788 are substantially adjacent to three edges of the display area 795. The data lines 730, the gate lines 750, the first pixel units 760, the second pixel units 765 and the first auxiliary gate lines 755 are disposed in the display area 795. The driving module 701 is disposed in the third border area 788. The gate lines 750 are substantially crossed with the data lines 730 perpendicularly.

The gate lines 750 comprise a first set of gate lines and a second set of gate lines. The first set of gate lines comprise a plurality of gate lines 750 disposed in a first internal area 741 of the display area 795. The first internal area 741 of the display area 795 is adjacent to the third border area 788. The second set of gate lines comprise a plurality of gate lines 750 disposed in a second internal area 742 of the display area 795. In the display area 795, the second internal area 742 is adjacent to the first internal area 741. The first auxiliary gate lines 755 are substantially parallel with the data lines 730. Each first auxiliary gate line 755 is electrically connected to one corresponding gate line 750 of the first set of gate lines. The second auxiliary gate lines 759 are disposed in the second border area 785 and are substantially parallel with the data lines 730. Each second auxiliary gate line 759 is electrically connected to one corresponding gate line 750 of the second set of gate lines. In other words, each gate line 750 is electrically connected to either one first auxiliary gate line 755 or one second auxiliary gate line 759.

The driving module 701 is electrically connected to the data lines 730 so that a plurality of data signals provided can be furnished to the first pixel units 760 and the second pixel units 765 via the data lines 730. The driving module 701 is further electrically connected to the first auxiliary gate lines 755 and the second auxiliary gate lines 759 so that a plurality of gate signals provided can be furnished to the gate lines 750 via the first auxiliary gate lines 755 and the second auxiliary gate lines 759. The liquid crystal display 700 makes use of the gate signals for providing a control of writing the data signals into the first pixel units 760 and the second pixel units 765 so as to illustrate images. The gate signal driving method of the liquid crystal display 700 can be inferred based on the gate signal driving methods of the fourth through seventh embodiments by analogy.

In one embodiment, the driving module 701 comprises at least one driver 705 for providing the data signals to the data lines 730 and also for providing the gate signals to the first auxiliary gate lines 755 and the second auxiliary gate lines 759. In another embodiment, the driving module 701 comprises a plurality of drivers 705. The drivers 705 comprise at least one source driver and at least one gate driver. The source driver is electrically connected to the data lines 730 for providing the data signals. The gate driver is electrically connected to the first auxiliary gate lines 755 and second auxiliary gate lines 759 for providing the gate signals to the gate lines 750. Alternatively, the drivers 705 comprises at least one source driver, at least one first gate driver and at least one second gate driver. The first gate driver is employed to provide a plurality of first gate signals to the first auxiliary gate lines 755. The second gate driver is employed to provide a plurality of second gate signals to the second auxiliary gate lines 759. The gate signal waveforms regarding the operation of the liquid crystal display 700 are identical to the signal waveforms shown in FIG. 4, and for the sake of brevity, further similar discussion thereof is omitted.

Since the first auxiliary gate lines 755 are disposed in the display area 795, the number of the second auxiliary gate lines 759 disposed in the second border area 785 can be lowered significantly, and therefore the width of the second border area 785 is narrowed significantly. Furthermore, the first border area 780 is not required to dispose any auxiliary gate line, and therefore the width of the first border area 780 is narrowed even more significantly. Accordingly, the size of the bottom substrate 710 can be reduced significantly. For that reason, the liquid crystal display 700 is also suitable for use as a small-size display installed in any portable electronic device.

Figure 18:
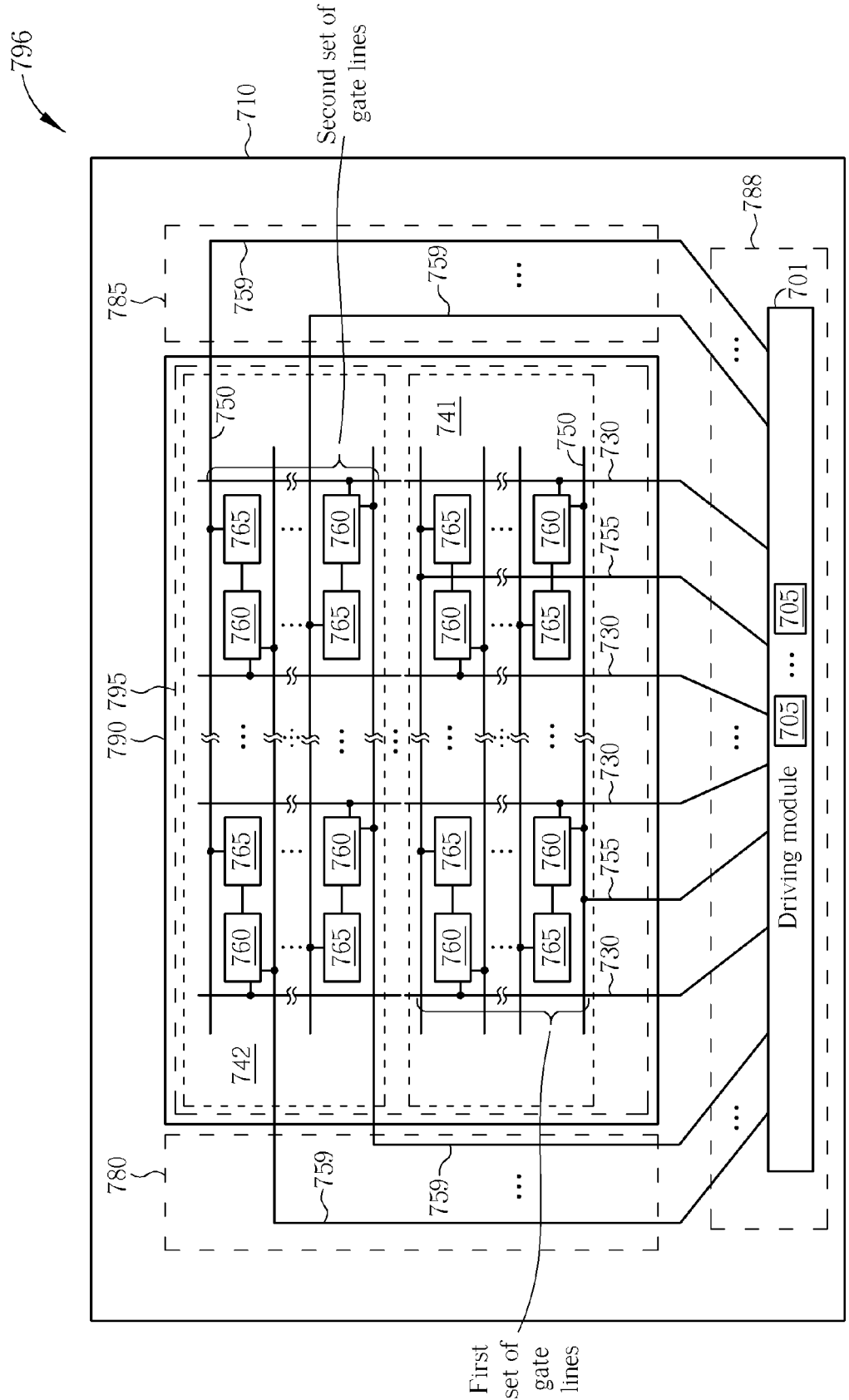
FIG. 18 is a schematic diagram showing a liquid crystal display in accordance with a twelfth embodiment of the present invention.

FIG. 18 is a schematic diagram showing a liquid crystal display in accordance with a twelfth embodiment of the present invention. As shown in FIG. 18, the circuit structure of the liquid crystal display 796 is similar to that of the liquid crystal display 700 shown in FIG. 17, differing only in that the second auxiliary gate lines 759 having odd order are disposed in the first border area 780 and the second auxiliary gate lines 759 having even order are disposed in the second border area 785. The second auxiliary gate lines 759 having odd order are electrically connected to the odd gate lines 750 of the second set of gate lines. The second auxiliary gate lines 759 having even order are electrically connected to the even gate lines 750 of the second set of gate lines. Other circuit structures of the liquid crystal display 796 are identical to those of the liquid crystal display 700 shown in FIG. 17, and the gate signal driving method of the liquid crystal display 796 can be inferred based on the gate signal driving methods of the fourth through seventh embodiments by analogy.

In another embodiment, the second auxiliary gate lines 759 having odd order are electrically connected to the even gate lines 750 of the second set of gate lines, and the second auxiliary gate lines 759 having even order are electrically connected to the odd gate lines 750 of the second set of gate lines.

Figure 19:
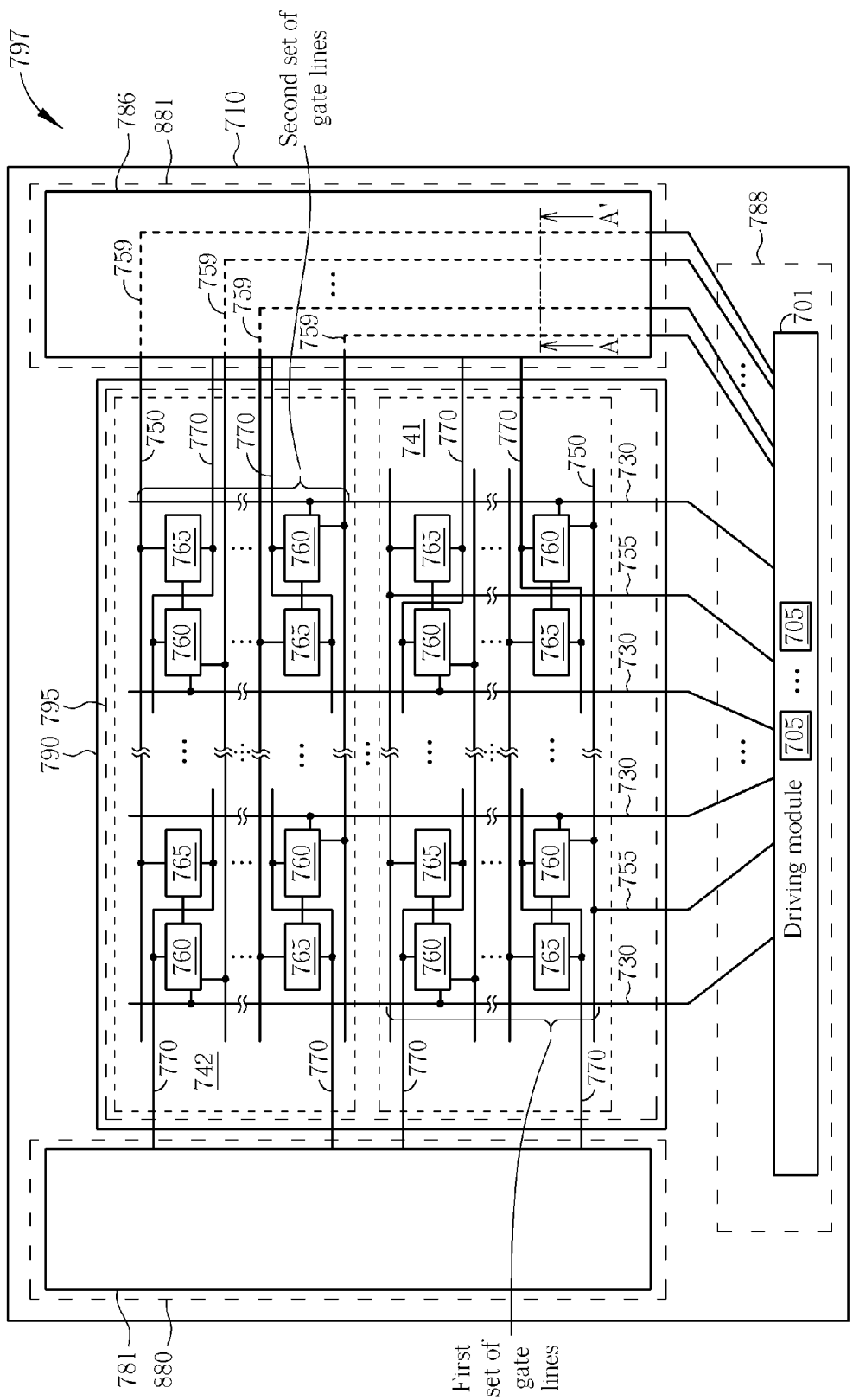
FIG. 19 is a schematic diagram showing a liquid crystal display in accordance with a thirteenth embodiment of the present invention.

FIG. 19 is a schematic diagram showing a liquid crystal display in accordance with a thirteenth embodiment of the present invention. As shown in FIG. 19, the circuit structure of the liquid crystal display 797 is similar to that of the liquid crystal display 700 shown in FIG. 17. The liquid crystal display 797 further comprises two adjust layers 781 and 786 and a plurality of common lines 770. The adjust layer 781 is disposed in the first border area 880. The adjust layer 786 and the second auxiliary gate lines 759 are disposed in the second border area 881.

The common lines 770, disposed in the display area 795, are electrically connected to the first pixel units 760 and the second pixel units 765. The second auxiliary gate lines 759 are a plurality of conductive lines formed in same layer or in different layers based on an interlace arrangement or interleaving each other. The adjust layers 781 and 786 are electrically connected to the common lines 770 for delivering the common voltage. The adjust layer 781 and 786 can be opaque metal layers or transparent electrode layers such as ITO (Indium-Tin-Oxide) electrode layers. There is at least one insulation layer disposed between the second auxiliary gate lines 759 and the adjust layer 786. The couple capacitor between the second auxiliary gate lines 759 and the adjust layer 786 can be employed to adjust time constant regarding transmission of gate signals. Compared with the couple capacitor related to the first auxiliary gate line 755 disposed in the display area 795, the couple capacitor related to the second auxiliary gate line 759 is relatively small without the aid of the couple capacitor corresponding to the adjust layer 786. For that reason, the couple capacitor corresponding to the adjust layer 786 is employed to substantially equalize transmission delay times of all gate signals so as to avoid flickering phenomena.

Figure 20:
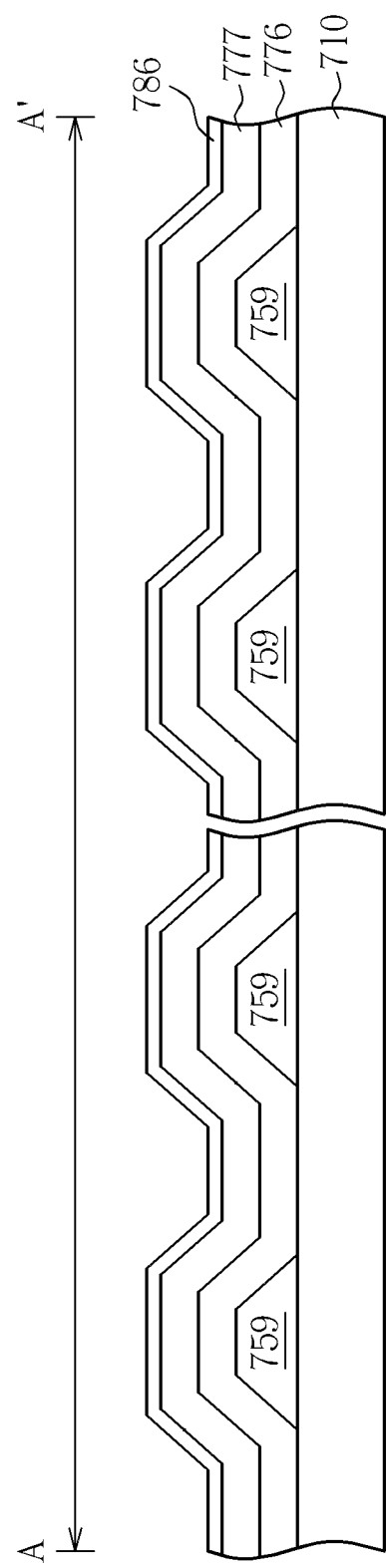
FIG. 20 is a schematic diagram illustrating a cross-sectional structure along the dashed line AA' shown in FIG. 19 according to the liquid crystal display having the second auxiliary gate lines formed in same layer.

FIG. 20 is a schematic diagram illustrating a cross-sectional structure along the dashed line AA' shown in FIG. 19 according to the liquid crystal display 797 having the second auxiliary gate lines formed in same layer. As shown in FIG. 20, the second auxiliary gate lines 759 are disposed on top of the bottom substrate 710; in addition, a first insulation layer 776 and a second insulation layer 777 are disposed between the second auxiliary gate lines 759 and the adjust layer 786. It is noted that all the second auxiliary gate lines 759 are formed in same layer. In one embodiment, the adjust layer 786 is a transparent electrode layer having a thickness of about 400~800 angstroms, the second auxiliary gate line 759 is a conductive line having a thickness of about 1000~3000 angstroms, and both the first insulation layer 776 and the second insulation layer 777 have a thickness of about 2000~3000 angstroms.

Figure 21:
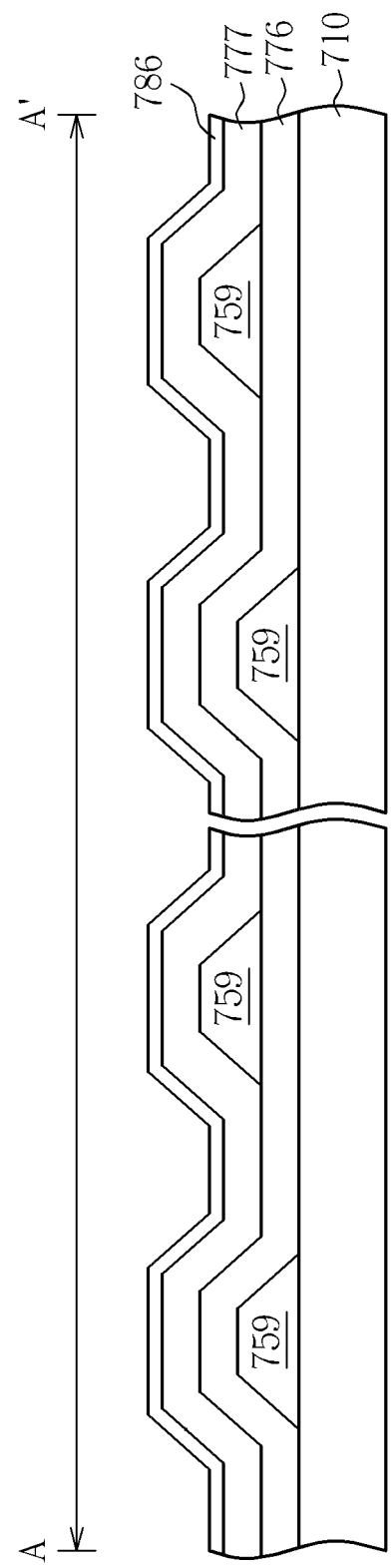
FIG. 21 is a schematic diagram illustrating a cross-sectional structure along the dashed line AA' shown in FIG. 19 according to the liquid crystal display having the second auxiliary gate lines formed in different layers.

FIG. 21 is a schematic diagram illustrating a cross-sectional structure along the dashed line AA' shown in FIG. 19 according to the liquid crystal display 797 having the second auxiliary gate lines formed in different layers. The cross-sectional structure shown in FIG. 21 is similar to the cross-sectional structure shown in FIG. 20, differing in that the second auxiliary gate lines 759 are formed in different layers interleaving each other. As shown in FIG. 21, parts of the second auxiliary gate lines 759 are disposed between the bottom substrate 710 and the first insulation layer 776, and other parts of the second auxiliary gate lines 759 are disposed between the first insulation layer 776 and the second insulation layer 777. The adjust layer 786 is disposed on top of the second insulation layer 777, i.e. on top of the second auxiliary gate lines 759.

Figure 22:
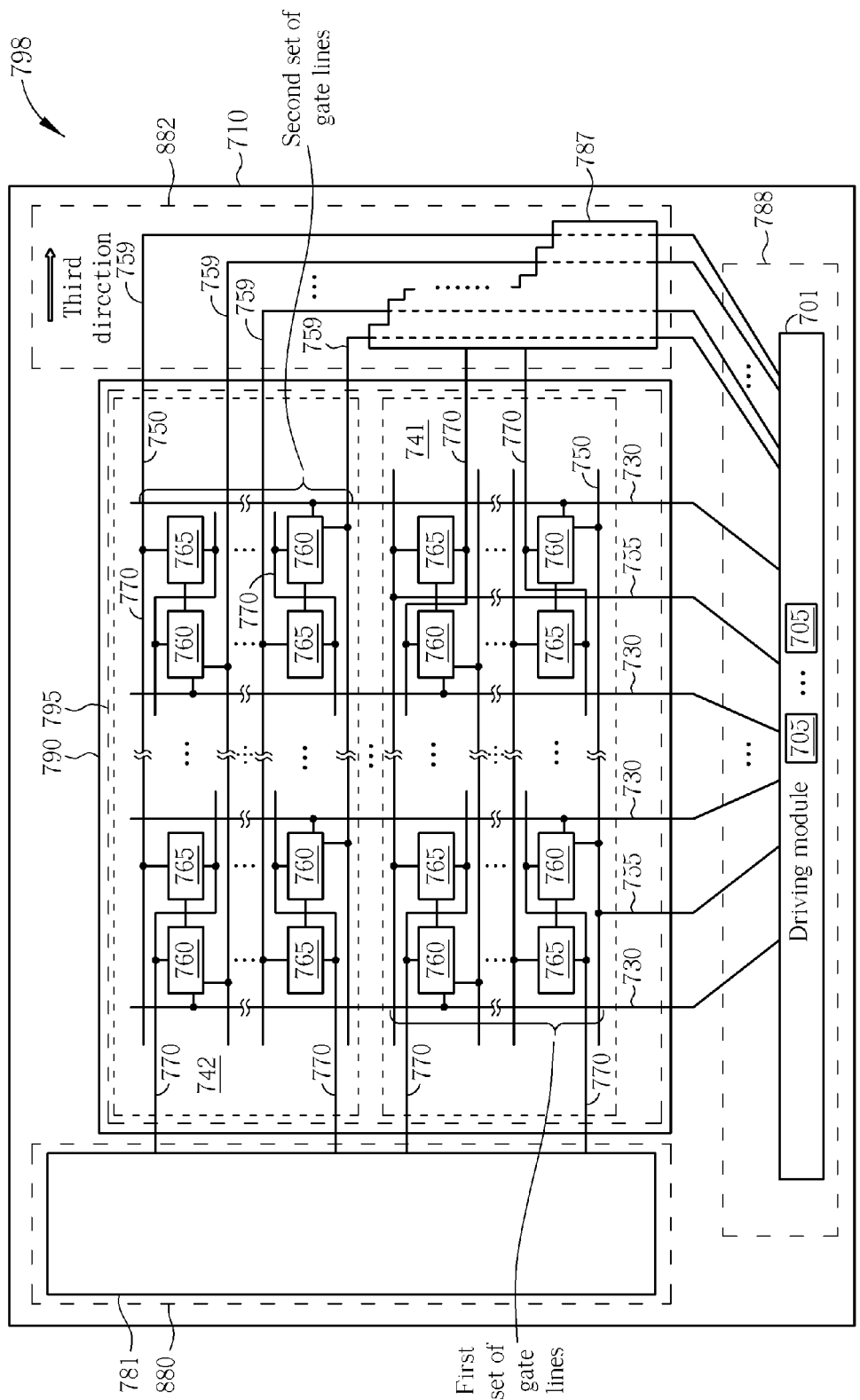
FIG. 22 is a schematic diagram showing a liquid crystal display in accordance with a fourteenth embodiment of the present invention.

FIG. 22 is a schematic diagram showing a liquid crystal display in accordance with a fourteenth embodiment of the present invention. As shown in FIG. 22, the circuit structure of the liquid crystal display 798 is similar to that of the liquid crystal display 797 shown in FIG. 19, differing only in that the adjust layer 787 is disposed in the second border area 882 based on a down stair-like distribution along a third direction. Therefore, the lengths/areas of the second auxiliary gate lines 759 covered with the adjust layer 787 are reduced gradually along the third direction so that the couple capacitances between the second auxiliary gate lines 759 and the adjust layer 787 are gradually reduced also along the third direction. Since the lengths of the second auxiliary gate lines 759 is gradually increasing from innermost to outermost, i.e. along the third direction, the resistances of the second auxiliary gate lines 759 is increasing gradually from innermost to outermost, and the resistance differences of the second auxiliary gate lines 759 will cause different time constants regarding transmission of gate signals. Accordingly, different couple capacitances between the second auxiliary gate lines 759 and the adjust layer 787 can be employed to compensate different resistances of the second auxiliary gate lines 759 for substantially equalizing transmission delay times of all gate signals so as to avoid flickering phenomena.

In the embodiment shown in FIG. 22, the second auxiliary gate lines 759 of the liquid crystal display 798 are conductive lines formed in same layer. In another embodiment, the second auxiliary gate lines 759 of the liquid crystal display 798 can be formed in different layers based on an interlace arrangement or interlacing each other. However, there are two insulation layers disposed between the adjust layer 787 and the second auxiliary gate lines 759 placed in lower layer while there is just one insulation layer disposed between the adjust layer 787 and the second auxiliary gate lines 759 placed in upper layer. That is, the couple capacitance of one unit area, between the adjust layer 787 and the second auxiliary gate line 759 placed in upper layer, is greater than the couple capacitance of another unit area, between the adjust layer 787 and the second auxiliary gate line 759 placed in lower layer. For that reason, the coverage lengths of the adjust layer 787, on the second auxiliary gate lines 759 placed in upper layer, might be shortened for equalizing transmission delay times of all gate signals. In summary, the lengths of the second auxiliary gate lines 759 covered with the adjust layer 787 can be individually adjusted for equalizing transmission delay times of all gate signals so as to avoid flickering phenomena.

Figure 23:
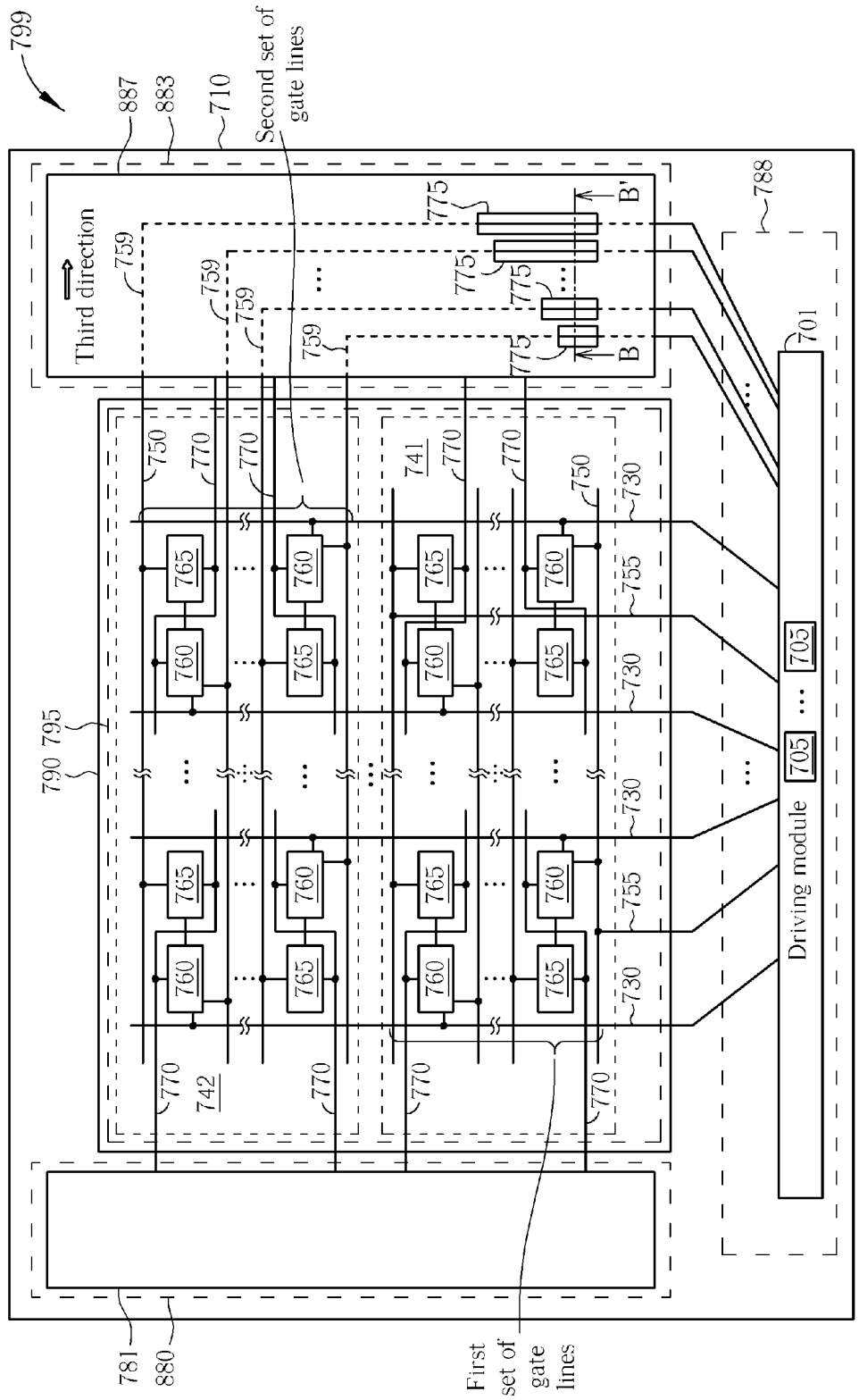
FIG. 23 is a schematic diagram showing a liquid crystal display in accordance with a fifteenth embodiment of the present invention.

FIG. 23 is a schematic diagram showing a liquid crystal display in accordance with a fifteenth embodiment of the present invention. As shown in FIG. 23, the circuit structure of the liquid crystal display 799 is similar to that of the liquid crystal display 797 shown in FIG. 19, differing only in that the adjust layer 887, disposed in the second border area 883, comprises a plurality of opens 775. The second auxiliary gate lines 759 are not covered with the adjust layer 887 in the areas of the opens 775. The lengths/areas of the opens 775 are gradually increasing along the third direction. In other words, the lengths/areas of the second auxiliary gate lines 759 covered with the adjust layer 887 are gradually decreasing along the third direction. In view of that, the couple capacitances between the second auxiliary gate lines 759 and the adjust layer 887 are decreasing gradually along the third direction, and different resistances of the second auxiliary gate lines 759 can be compensated for substantially equalizing transmission delay times of all gate signals so as to avoid flickering phenomena.

In the embodiment shown in FIG. 23, the second auxiliary gate lines 759 of the liquid crystal display 799 are conductive lines formed in same layer. In another embodiment, the second auxiliary gate lines 759 of the liquid crystal display 799 can be formed in different layers based on an interlace arrangement or interleaving each other. However, as aforementioned, the couple capacitance of one unit area, between the adjust layer 887 and the second auxiliary gate line 759 placed in upper layer, is greater than the couple capacitance of another unit area, between the adjust layer 887 and the second auxiliary gate line 759 placed in lower layer. For that reason, the lengths/areas of the opens 775, corresponding to the second auxiliary gate lines 759 placed in upper layer, might be enlarged for equalizing transmission delay times of all gate signals. In summary, the lengths/areas of the second auxiliary gate lines 759 covered with the adjust layer 887 can be individually adjusted for equalizing transmission delay times of all gate signals so as to avoid flickering phenomena.

Figure 24:
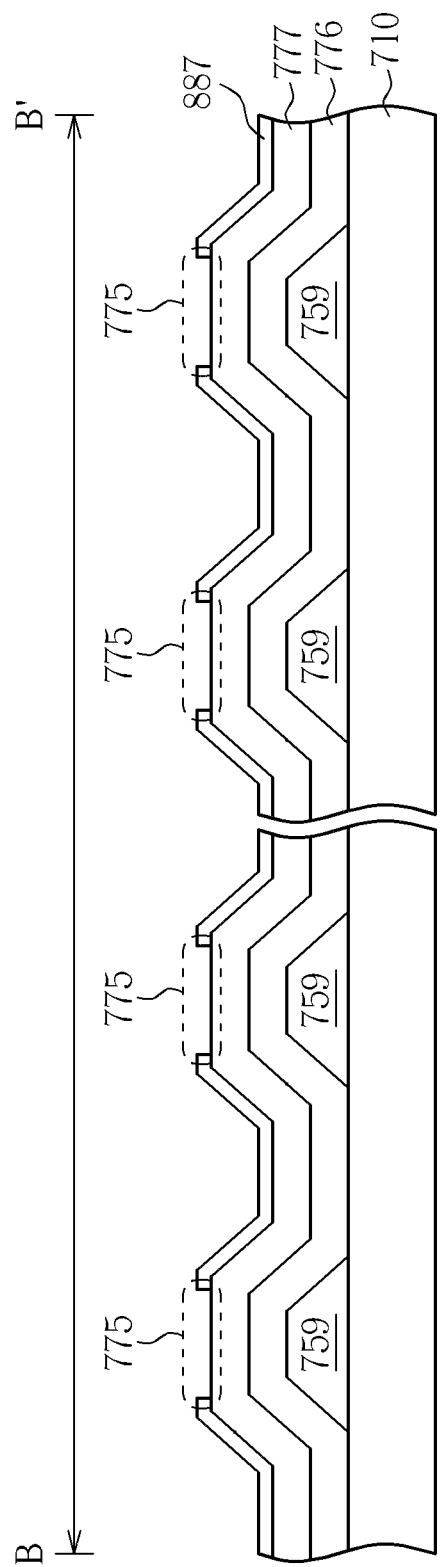
FIG. 24 is a schematic diagram illustrating a cross-sectional structure along the dashed line BB' shown in FIG. 23 according to the liquid crystal display having the second auxiliary gate lines formed in same layer.

FIG. 24 is a schematic diagram illustrating a cross-sectional structure along the dashed line BB' shown in FIG. 23 according to the liquid crystal display 799 having the second auxiliary gate lines formed in same layer. The cross-sectional structure shown in FIG. 24 is similar to the cross-sectional structure shown in FIG. 20, differing in that the adjust layer 887 is absent on top of the second auxiliary gate lines 759, i.e. in the areas of the opens 775.

Figure 25:
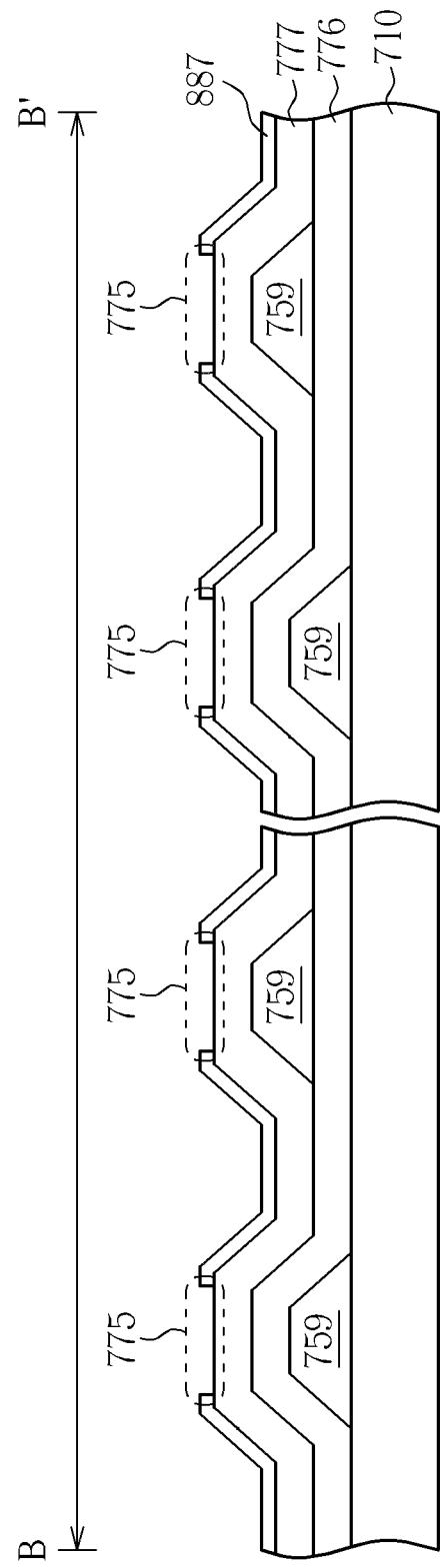
FIG. 25 is a schematic diagram illustrating a cross-sectional structure along the dashed line BB' shown in FIG. 23 according to the liquid crystal display having the second auxiliary gate lines formed in different layers.

FIG. 25 is a schematic diagram illustrating a cross-sectional structure along the dashed line BB' shown in FIG. 23 according to the liquid crystal display 799 having the second auxiliary gate lines formed in different layers. The cross-sectional structure shown in FIG. 25 is similar to the cross-sectional structure shown in FIG. 21, differing in that the adjust layer 887 is absent on top of the second auxiliary gate lines 759, i.e. in the areas of the opens 775.

Figure 26:
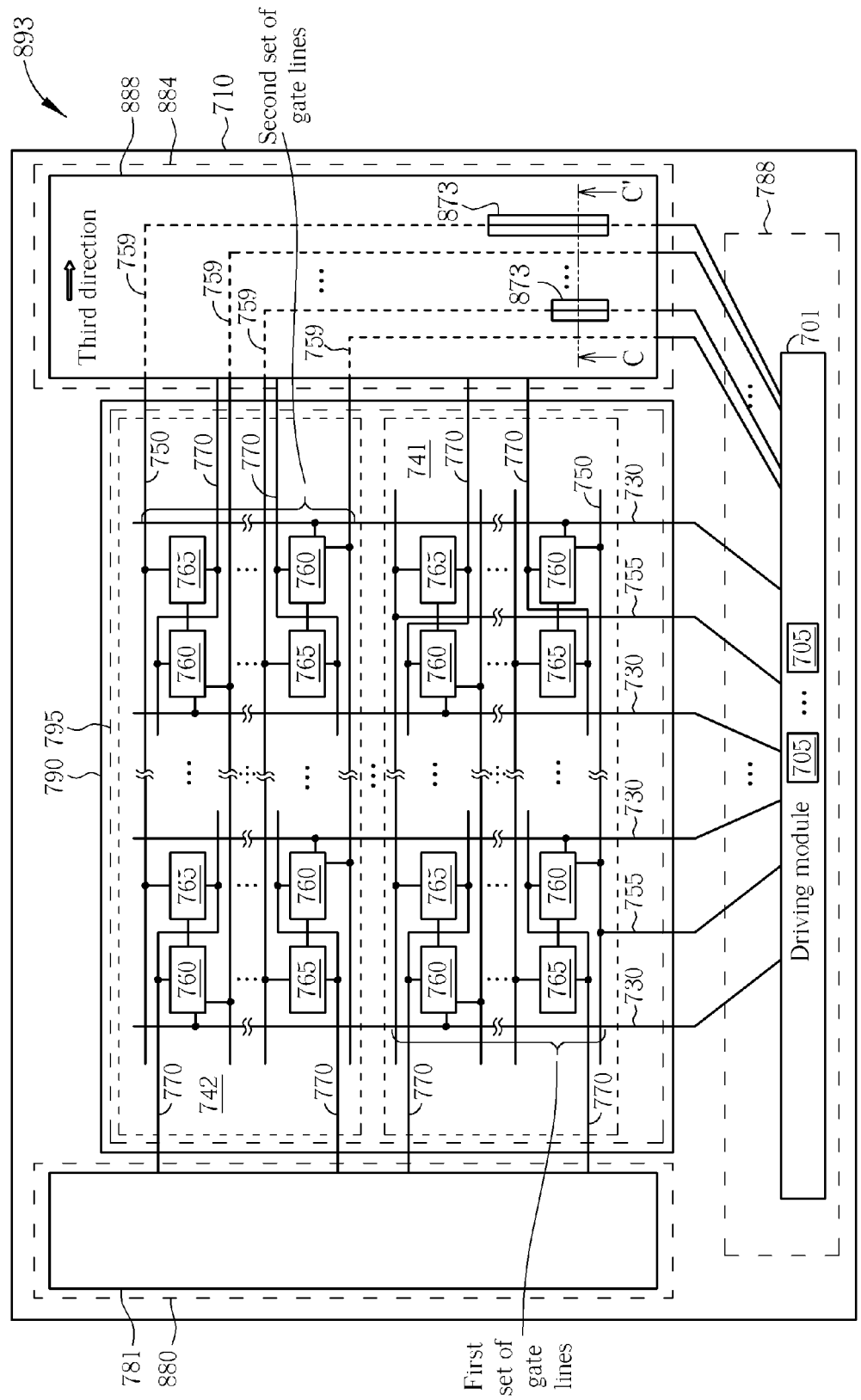
FIG. 26 is a schematic diagram showing a liquid crystal display in accordance with a sixteenth embodiment of the present invention.

FIG. 26 is a schematic diagram showing a liquid crystal display in accordance with a sixteenth embodiment of the present invention. As shown in FIG. 26, the circuit structure of the liquid crystal display 893 is similar to that of the liquid crystal display 797 shown in FIG. 19, differing only in that the adjust layer 888, disposed in the second border area 884, comprises a plurality of opens 873. In the embodiment shown in FIG. 26, the second auxiliary gate lines 759 are formed in different layers based on an interlace arrangement or interleaving each other. The adjust layer 888 is absent only on top of the second auxiliary gate lines 759 placed in upper layer, i.e. in the areas of the opens 873. In other words, the second auxiliary gate lines 759 placed in lower layer are wholly covered with the adjust layer 888. It is noted that the auxiliary gate lines 759 placed in upper layer is a plurality of conductive lines disposed between the first insulation layer 776 and the second insulation layer 777, and the auxiliary gate lines 759 placed in lower layer is a plurality of conductive lines disposed between the first insulation layer 776 and the bottom substrate 710.

Figure 27:
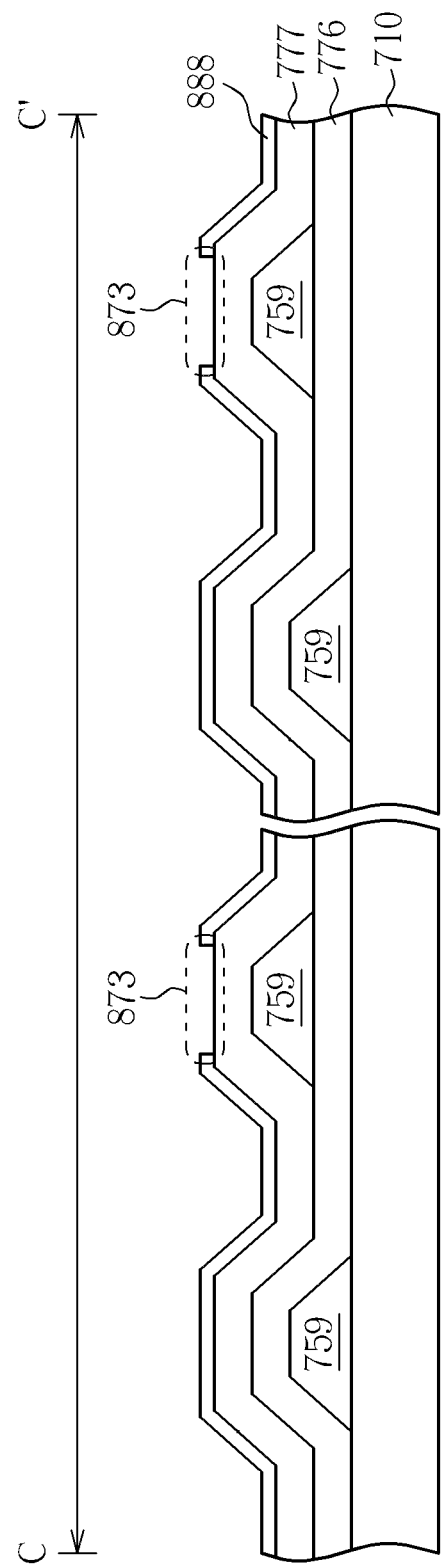
FIG. 27 is a schematic diagram illustrating a cross-sectional structure along the dashed line CC' shown in FIG. 26 according to the liquid crystal display having the second auxiliary gate lines formed in different layers.

FIG. 27 is a schematic diagram illustrating a cross-sectional structure along the dashed line CC' shown in FIG. 26 according to the liquid crystal display 893 having the second auxiliary gate lines formed in different layers. The cross-sectional structure shown in FIG. 27 is similar to the cross-sectional structure shown in FIG. 25, differing in that the adjust layer 888 is absent only on top of the second auxiliary gate lines 759 placed in upper layer, i.e. in the areas of the opens 873. That is, the second auxiliary gate lines 759 placed in lower layer are wholly covered with the adjust layer 888.

Figure 28:
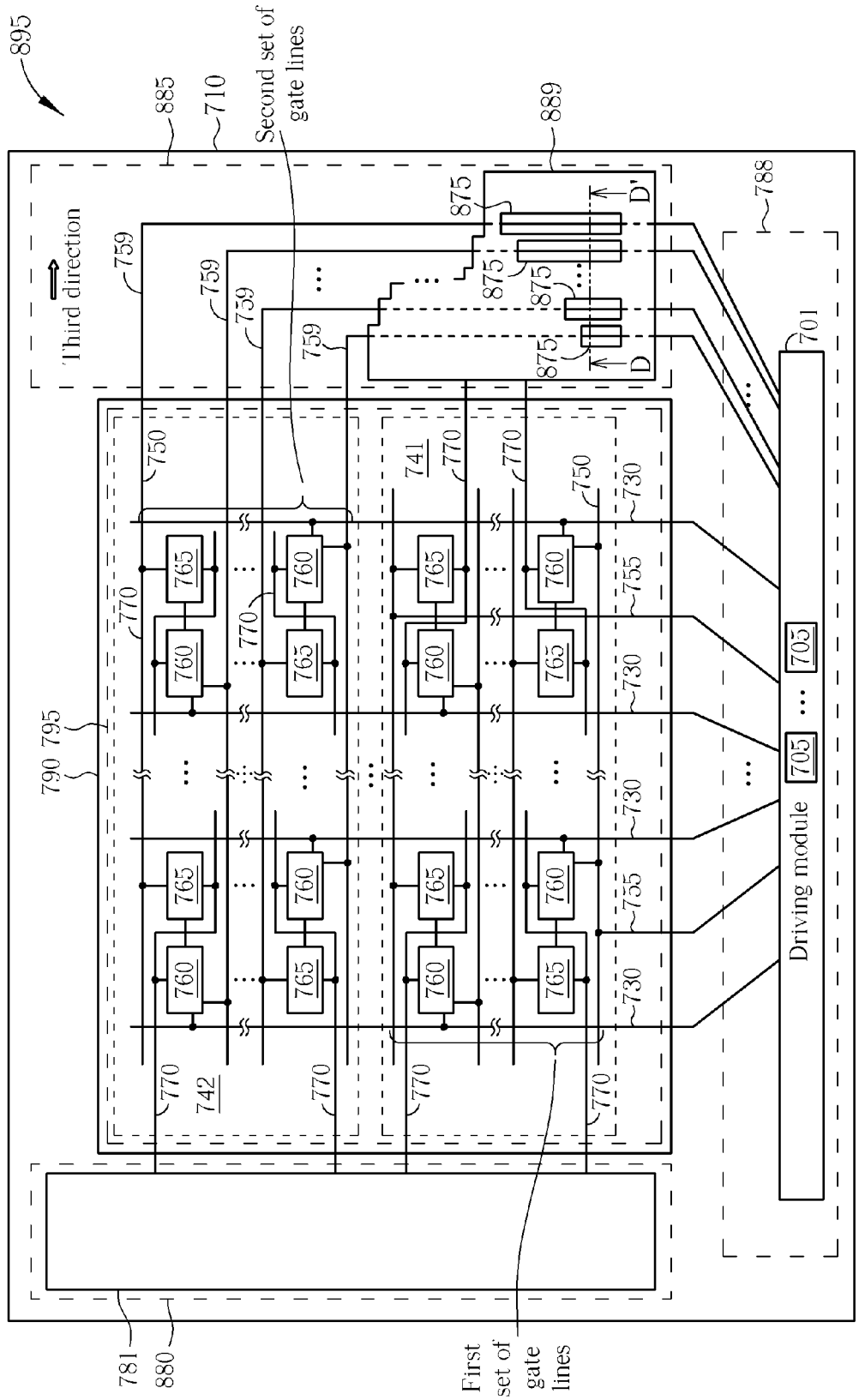
FIG. 28 is a schematic diagram showing a liquid crystal display in accordance with a seventeenth embodiment of the present invention.

FIG. 28 is a schematic diagram showing a liquid crystal display in accordance with a seventeenth embodiment of the present invention. As shown in FIG. 28, the circuit structure of the liquid crystal display 895 is similar to that of the liquid crystal display 797 shown in FIG. 19, differing only in that the adjust layer 889 is disposed in the second border area 885 based on a down stair-like distribution along a third direction; furthermore, the adjust layer 889 comprises a plurality of opens 875.

The second auxiliary gate lines 759 are not covered with the adjust layer 889 in the areas of the opens 875. The lengths/areas of the opens 875 are gradually increasing along the third direction. Accordingly, the lengths/areas of the second auxiliary gate lines 759 covered with the adjust layer 889 are gradually decreasing along the third direction. For that reason, the couple capacitances between the second auxiliary gate lines 759 and the adjust layer 889 are decreasing gradually along the third direction, and different resistances of the second auxiliary gate lines 759 can be compensated for substantially equalizing transmission delay times of all gate signals so as to avoid flickering phenomena. In the embodiment shown in FIG. 28, the second auxiliary gate lines 759 of the liquid crystal display 895 are a plurality of conductive lines formed in same layer or in different layers based on an interlace arrangement or interleaving each other. That is, the cross-sectional structure along the dashed line DD' shown in FIG. 28 can be substantially identical to the cross-sectional structure shown in FIG. 24 or FIG. 25. In another embodiment regarding the liquid crystal display 895 having the second auxiliary gate lines formed in different layers, the adjust layer 889 is absent only on top of the second auxiliary gate lines 795 placed in upper layer, i.e. the open 875 exists only on top of the second auxiliary gate lines 795 placed in upper layer and the related cross-sectional structure along the dashed line DD' is substantially identical to the cross-sectional structure shown in FIG. 27.

Regarding the aforementioned third through twelfth embodiments of the liquid crystal display according to the present invention, the plurality of auxiliary gate lines, disposed in the first or second border area, can be employed to adjust time constant regarding transmission of gate signals based on one of the thirteenth through seventeenth embodiments, for substantially equalizing transmission delay times of all gate signals so as to avoid flickering phenomena.

To sum up, in the liquid crystal display of the present invention, at least parts of the auxiliary gate lines are disposed in the display area so that the widths of the border areas can be narrowed significantly for reducing the size of the bottom substrate. Consequently, the liquid crystal display of the present invention is suitable for use as a small-size display installed in any portable electronic device.

The present invention is by no means limited to the embodiments as described above by referring to the accompanying drawings, which may be modified and altered in a variety of different ways without departing from the scope of the present invention. Thus, it should be understood by those skilled in the art that various modifications, combinations, sub-combinations and alternations might occur depending on design requirements and other factors insofar as they are within the scope of the appended claims or the equivalents thereof.

What is claimed is:

1. A display device, comprising:
    a substrate having a display area and a border area, the border area being substantially surrounding the display area;
    a plurality of data lines disposed in the display area of the substrate;
    a plurality of gate lines disposed in the display area of the substrate and substantially crossed with the data lines perpendicularly, the plurality of gate lines comprising a first set of gate lines and a second set of gate lines;
    a plurality of first auxiliary gate lines disposed in the display area of the substrate, the first auxiliary gate lines being substantially parallel with the data lines, each first auxiliary gate line being electrically connected to a corresponding gate line of the first set of gate lines;
    a plurality of second auxiliary gate lines disposed in the border area of the substrate, each second auxiliary gate line being electrically connected to a corresponding gate line of the second set of gate lines;
    a driving module disposed in the border area of the substrate, the driving module being electrically connected to the data lines, the second auxiliary gate lines, and the first auxiliary gate lines;
    a plurality of pixel units disposed in the display area of the substrate;
    a plurality of common lines electrically coupled with the pixel units;
    an insulation layer disposed in the border area, the second auxiliary gate lines being covered with the insulation layer; and
    an adjust layer disposed in the border area to overlap at least one of the second auxiliary gate lines, at least a portion of the insulation layer being covered with the adjust layer, wherein a first couple capacitor is formed between the at least one of the second auxiliary gate lines and the adjust layer;
    wherein the adjust layer is electrically connected to the common lines wherein each first auxiliary gate line and the adjust layer are not overlapped, each first auxiliary gate line is not electrically connected to the second set of gate lines, and a second couple capacitor is formed between at least one of the second set of gate lines and at least one of the first auxiliary gate lines.

2. The display device of claim 1, wherein the driving module comprises at least one driver for providing a plurality of data signals to the data lines and for providing a plurality of gate signals to the first auxiliary gate lines.

3. The display device of claim 1, wherein the driving module comprises:
    at least one source driver, electrically connected to the data lines, for providing a plurality of data signals to the data lines; and
    at least one gate driver, electrically connected to the first auxiliary gate lines, for providing a plurality of gate signals to the first auxiliary gate lines.

4. The display device of claim 1, wherein the first auxiliary gate lines and the data lines interleave each other.

5. The display device of claim 1, wherein the driving module comprises a plurality of output ports, the data lines and the first auxiliary gate lines interleaving each other and being electrically connected to the corresponding output ports.

6. The display device of claim 1, wherein the second auxiliary gate lines are a plurality of conductive lines formed in a same layer.

7. The display device of claim 1, wherein the second auxiliary gate lines are a plurality of conductive lines interleaving one another and formed in at least two different layers.

8. The display device of claim 1, wherein the adjust layer forms a stair-like distribution and covers the second auxiliary gate lines.

9. The display device of claim 1, wherein the adjust layer has a plurality of opens, each open being positioned on top of a corresponding second auxiliary gate line.

10. The display device of claim 1, wherein the driving module comprises:
    a plurality of data output ports, each data output port being electrically connected to a corresponding data line;
    a plurality of first output ports, each first output port being electrically connected a corresponding first auxiliary gate line, wherein the first output ports and the data output ports interleaving each other; and
    a plurality of second output ports, each second output port being electrically connected to a corresponding second auxiliary gate line.

11. The display device of claim 10, wherein the second auxiliary gate lines are electrically connected to the second output ports sequentially along a first direction or along a second direction opposite to the first direction.

12. The display device of claim 1, wherein the border area has a first area and a second area, the gate lines comprise a first set of gate lines and a second set of gate lines, each first auxiliary gate line being electrically connected to a corresponding gate line of the first set of gate lines, and wherein the display device further comprises:
    a plurality of second auxiliary gate lines disposed in the first area, each second auxiliary gate line being electrically connected between an odd gate line of the second set of gate lines and the driving module; and
    a plurality of third auxiliary gate lines disposed in the second area, each third auxiliary gate line being electrically connected between an even gate line of the second set of gate lines and the driving module.

13. The display device of claim 1, wherein the border area has a first area and a second area, the gate lines comprises a first set of gate lines, a second set of gate lines and a third set of gate lines, each first auxiliary gate line being electrically connected to a corresponding gate line of the first set of gate lines, and wherein the display device further comprises:
    a plurality of second auxiliary gate lines disposed in the first area, each second auxiliary gate line being electrically connected between a corresponding gate line of the second set of gate lines and the driving module; and
    a plurality of third auxiliary gate lines disposed in the second area, each third auxiliary gate line being electrically connected between a corresponding gate line of the third set of gate lines and the driving module.

14. The display device of claim 13, wherein the driving module comprises:

a plurality of data output ports, each data output port being electrically connected to a corresponding data line;

a plurality of first output ports, each first output port being electrically connected a corresponding first auxiliary gate line, wherein the first output ports and the data output ports interleave each other;

a plurality of second output ports, each second output port being electrically connected to a corresponding second auxiliary gate line; and a plurality of third output ports, each third output port being electrically connected to a corresponding third auxiliary gate line.

15. The display device of claim 13, wherein each second auxiliary gate line is electrically connected to an odd gate line of the second set of gate lines, each third auxiliary gate line is electrically connected to an odd gate line of the third set of gate lines, and wherein the display device further comprises:

a plurality of fourth auxiliary gate lines disposed in the second area, each fourth auxiliary gate line being electrically connected between an even gate line of the second set of gate lines and the driving module; and a plurality of fifth auxiliary gate lines disposed in the first area, each fifth auxiliary gate line being electrically connected between an even gate line of the third set of gate lines and the driving module.

16. The display device of claim 13, wherein each second auxiliary gate line is electrically connected to an odd gate line of the second set of gate lines, each third auxiliary gate line is electrically connected to an even gate line of the third set of gate lines, and wherein the display device further comprises:

a plurality of fourth auxiliary gate lines disposed in the second area, each fourth auxiliary gate line being electrically connected between an even gate line of the second set of gate lines and the driving module; and a plurality of fifth auxiliary gate lines disposed in the first area, each fifth auxiliary gate line being electrically connected between an odd gate line of the third set of gate lines and the driving module.

17. The display device of claim 1, further comprising:

a plurality of first pixel units disposed in the display area, each first pixel unit being electrically connected to a corresponding data line and a first gate line of the gate lines; and a plurality of second pixel units disposed in the display area, each second pixel unit being electrically connected to a corresponding first pixel unit and a second gate line of the gate lines.

18. The display device of claim 17, wherein the first and second gate lines electrically connected to the adjacent first and second pixel units are adjacent.

19. The display device of claim 17, wherein the first pixel unit comprises:

a data switch including a first end electrically connected to the corresponding data line, a gate end electrically connected to the first gate line, and a second end electrically connected to a corresponding second pixel unit; and a storage unit including a first end electrically connected to the second end of the data switch.

20. The display device of claim 17, wherein the second pixel unit comprises:

a data switch including a first end electrically connected to the corresponding first pixel unit, and a gate end electrically connected to the second gate line; and a storage unit including a first end electrically connected to a second end of the data switch, and a second end for receiving a common voltage.

21. The display device of claim 1, wherein the adjust layer delivers a common voltage.

22. The display device of claim 1, wherein the adjust layer comprises an opaque metal layer or a transparent electrode layer.

23. The display device of claim 1, wherein the adjust layer is a transparent electrode layer having a thickness of about 400~800 angstroms.

24. A display device, comprising:

a substrate having a display area and a border area, the border area being substantially surrounding the display area;

a plurality of data lines disposed in the display area of the substrate;

a plurality of gate lines disposed in the display area of the substrate and substantially crossed with the data lines perpendicularly, the plurality of gate lines comprising a first set of gate lines and a second set of gate lines;

a plurality of first auxiliary gate lines disposed in the display area of the substrate, the first auxiliary gate lines being substantially parallel with the data lines, each first auxiliary gate line being electrically connected to a corresponding gate line of the first set of gate lines;

a plurality of second auxiliary gate lines disposed in the border area of the substrate, each second auxiliary gate line being electrically connected to a corresponding gate line of the second set of gate lines;

a driving module disposed in the border area of the substrate, the driving module being electrically connected to the data lines, the second auxiliary gate lines, and the first auxiliary gate lines;

a plurality of pixel units disposed in the display area of the substrate;

a plurality of common lines electrically coupled with the pixel units;

an insulation layer disposed in the border area, the second auxiliary gate lines being covered with the insulation layer; and an adjust layer disposed in the border area to overlap at least one of the second auxiliary gate lines, at least a portion of the insulation layer being covered with the adjust layer, wherein the adjust layer comprises an opaque metal layer or a transparent electrode layer, and a first couple capacitor is formed between the at least one of the second auxiliary gate lines and the adjust layer wherein each first auxiliary gate line and the adjust layer are not overlapped, each first auxiliary gate line is not electrically connected to the second set of gate lines, and a second couple capacitor is formed between at least one of the second set of gate lines and at least one of the first auxiliary gate lines.

25. The display device of claim 24, wherein the adjust layer is completely within the border area and not disposed in the display area.

26. The display device of claim 24, wherein a thickness of each of the second auxiliary gate lines is about 1000~3000 angstroms.

27. The display device of claim 1, wherein the adjust layer is completely within the border area and not disposed in the display area.

28. The display device of claim 1, wherein a thickness of each of the second auxiliary gate lines is about 1000~3000 angstroms.

* * * * *